United States Patent
Cole et al.

(10) Patent No.: US 7,379,652 B2
(45) Date of Patent: May 27, 2008

(54) METHOD AND APPARATUS FOR DETECTING OPTICAL SPECTRAL PROPERTIES USING OPTICAL PROBE BEAMS WITH MULTIPLE SIDEBANDS

(75) Inventors: Zachary Cole, Bozeman, MT (US); Randy R. Reibel, Bozeman, MT (US); Krishna Mohan Rupavatharam, Bozeman, MT (US); William R. Babbitt, Bozeman, MT (US); Kristian D. Merkel, Bozeman, MT (US); Tiejun Chang, Bozeman, MT (US)

(73) Assignee: Montana State University, Bozeman, MT (US)

( * ) Notice: Subject to any disclaimer, the term of this patent is extended or adjusted under 35 U.S.C. 154(b) by 27 days.

(21) Appl. No.: 11/404,549

(22) Filed: Apr. 14, 2006

(65) Prior Publication Data

US 2007/0171407 A1    Jul. 26, 2007

Related U.S. Application Data

(63) Continuation-in-part of application No. 11/036,491, filed on Jan. 14, 2005, now Pat. No. 7,193,879.

(60) Provisional application No. 60/675,348, filed on Apr. 27, 2005.

(51) Int. Cl.
*G02B 6/00* (2006.01)

(52) U.S. Cl. ............... 385/147; 385/12; 356/300; 356/402; 356/432; 359/278; 359/325; 359/326

(58) Field of Classification Search ........ 356/300–332, 356/349, 368, 402, 432, 436–438; 359/278, 359/325, 3, 326; 365/106; 385/147
See application file for complete search history.

(56) References Cited

U.S. PATENT DOCUMENTS

| | | | |
|---|---|---|---|
| 4,297,035 A * | 10/1981 | Bjorklund | 356/402 |
| 4,765,736 A | 8/1988 | Gallagher et al. | |
| 4,846,571 A * | 7/1989 | Jelalian et al. | 356/5.09 |
| 5,928,146 A | 7/1999 | Itagaki et al. | |
| 2006/0012797 A1* | 1/2006 | Chang et al. | 356/484 |
| 2006/0126149 A1* | 6/2006 | Sellars et al. | 359/237 |
| 2006/0203324 A1* | 9/2006 | Harris et al. | 359/278 |

FOREIGN PATENT DOCUMENTS

WO    WO 03/098384 A2    11/2003

OTHER PUBLICATIONS

Gary C. Bjorklund, Frequency-modulation Spectroscopy: A New Method for Measuring Weak Absorptions and Dispersions, Optics Letters, Jan. 1, 1980, pp. 15-17, vol. 5, No. 1, Publisher: Optical Society of America, Published in: Washington, DC USA.

* cited by examiner

*Primary Examiner*—Frank G. Font
*Assistant Examiner*—Hung Lam
(74) *Attorney, Agent, or Firm*—Evans & Molinelli PLLC; Eugene Molinelli

(57) ABSTRACT

Techniques for detecting optical spectral properties of a target are described. The technique includes providing an optical carrier which has an optical frequency bandwidth which is narrow compared to the width of the narrowest spectral feature of the target to be determined. This optical carrier is then electro-optically modulated with an RF frequency chirp, creating an optical chirp probe beam with a frequency chirped optical spectrum having upper and lower frequency chirped sidebands that have amplitudes sufficient to be detected at a detector. The sidebands are frequency bands arranged symmetrically around the optical carrier frequency. The attributes of a sideband include a start frequency, bandwidth and chirp rate. A probe beam is generated with the sidebands and directed onto a target having a physical property with optical frequency dependence. An optical response signal resulting from an interaction between the probe beam and the target is detected. The optical frequency dependence of the physical property of the target is determined based on the optical response signal and the attributes of the sidebands.

14 Claims, 20 Drawing Sheets

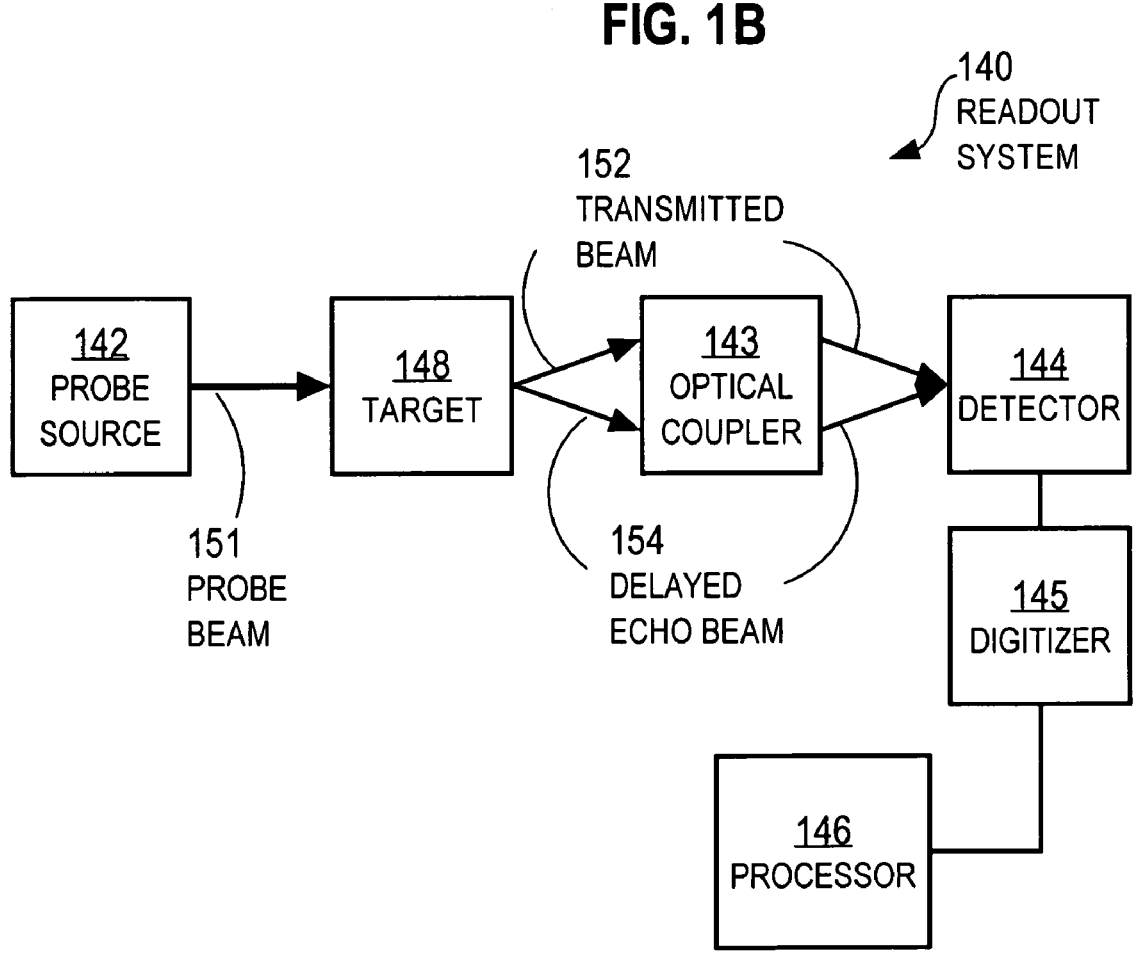

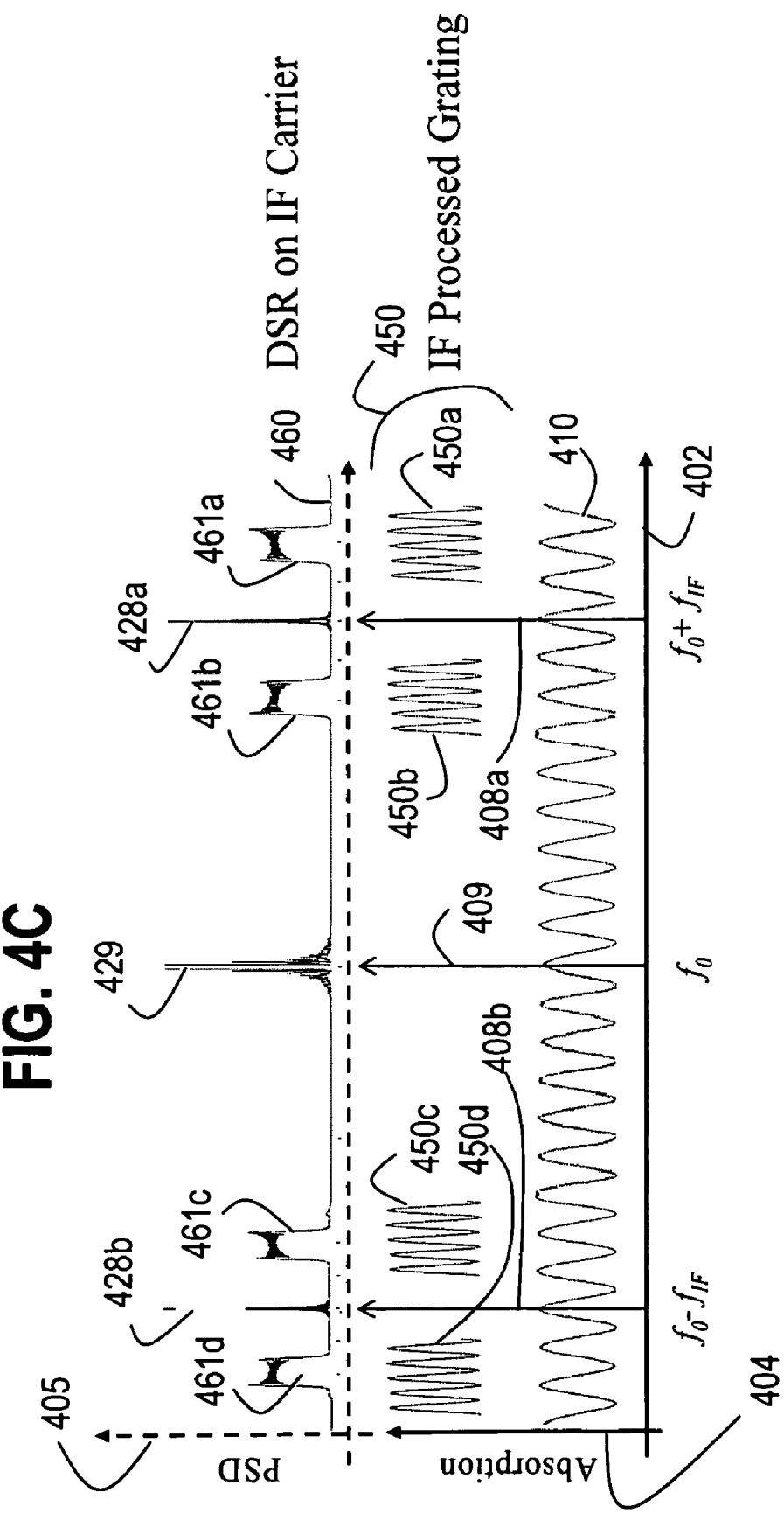

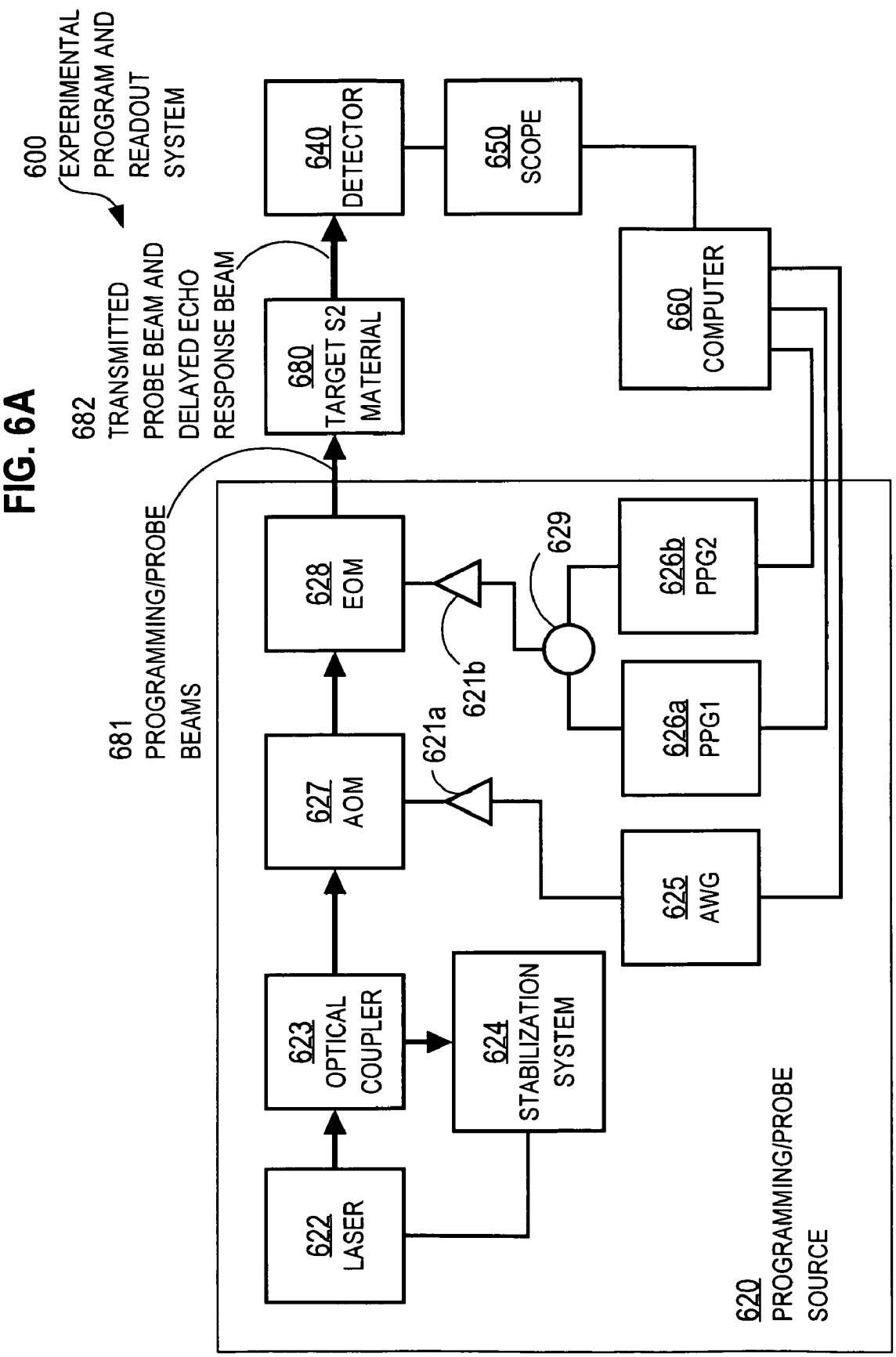

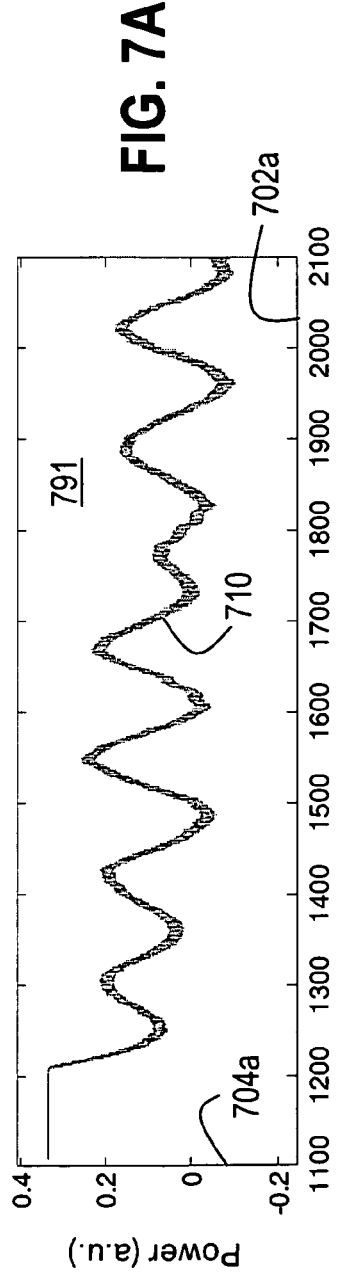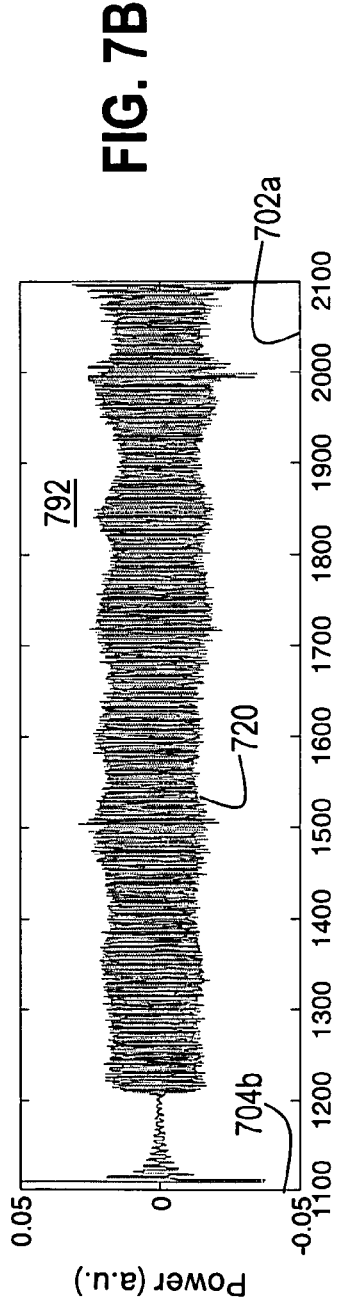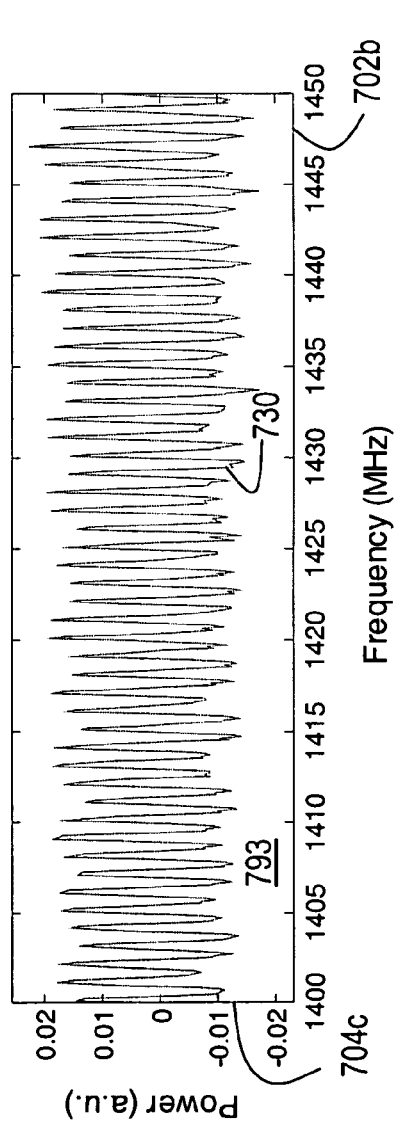

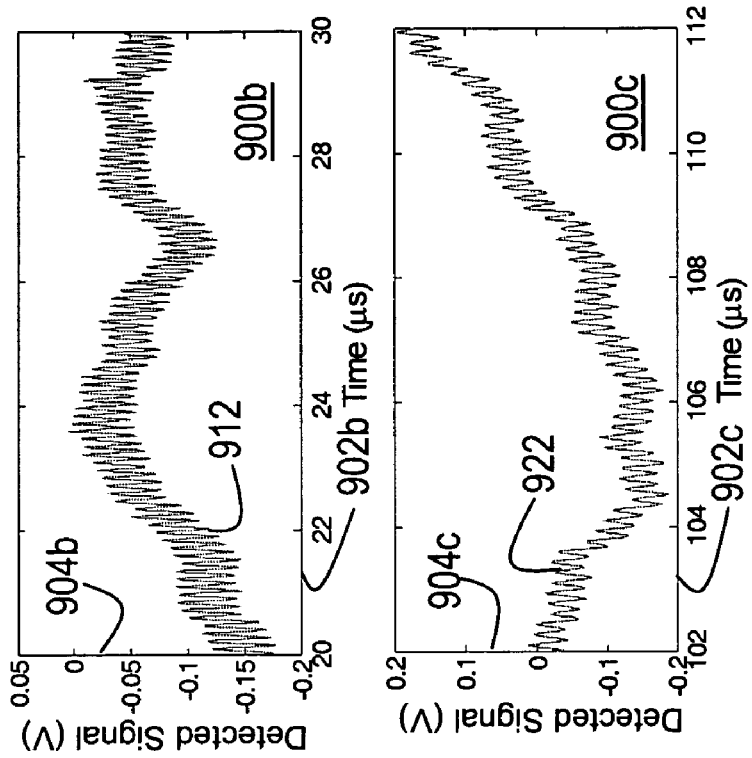
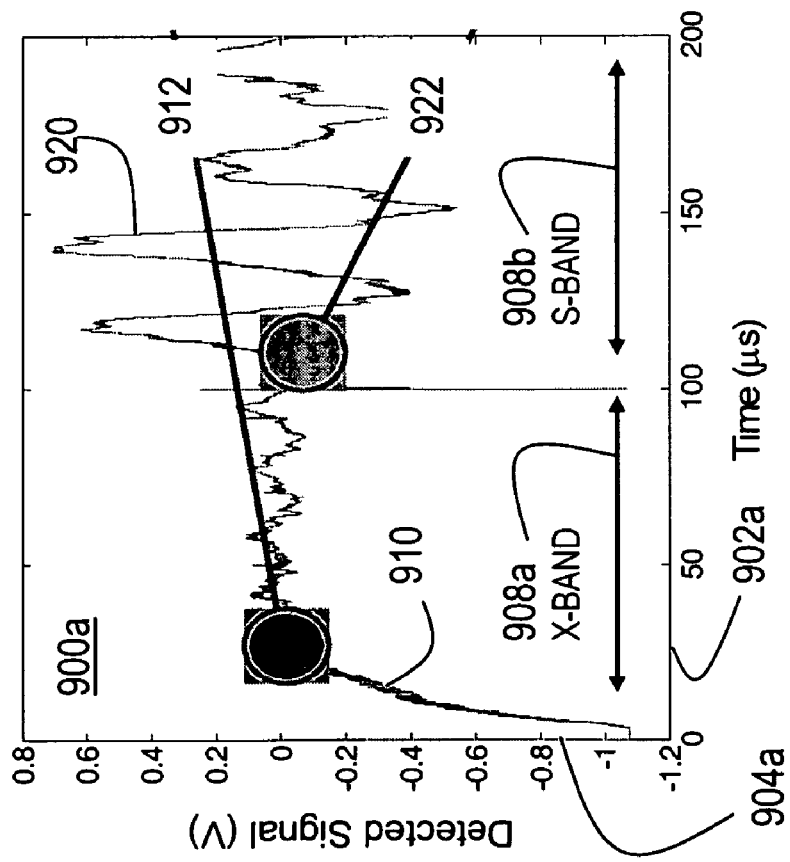
FIG. 9B
FIG. 9C
FIG. 9A

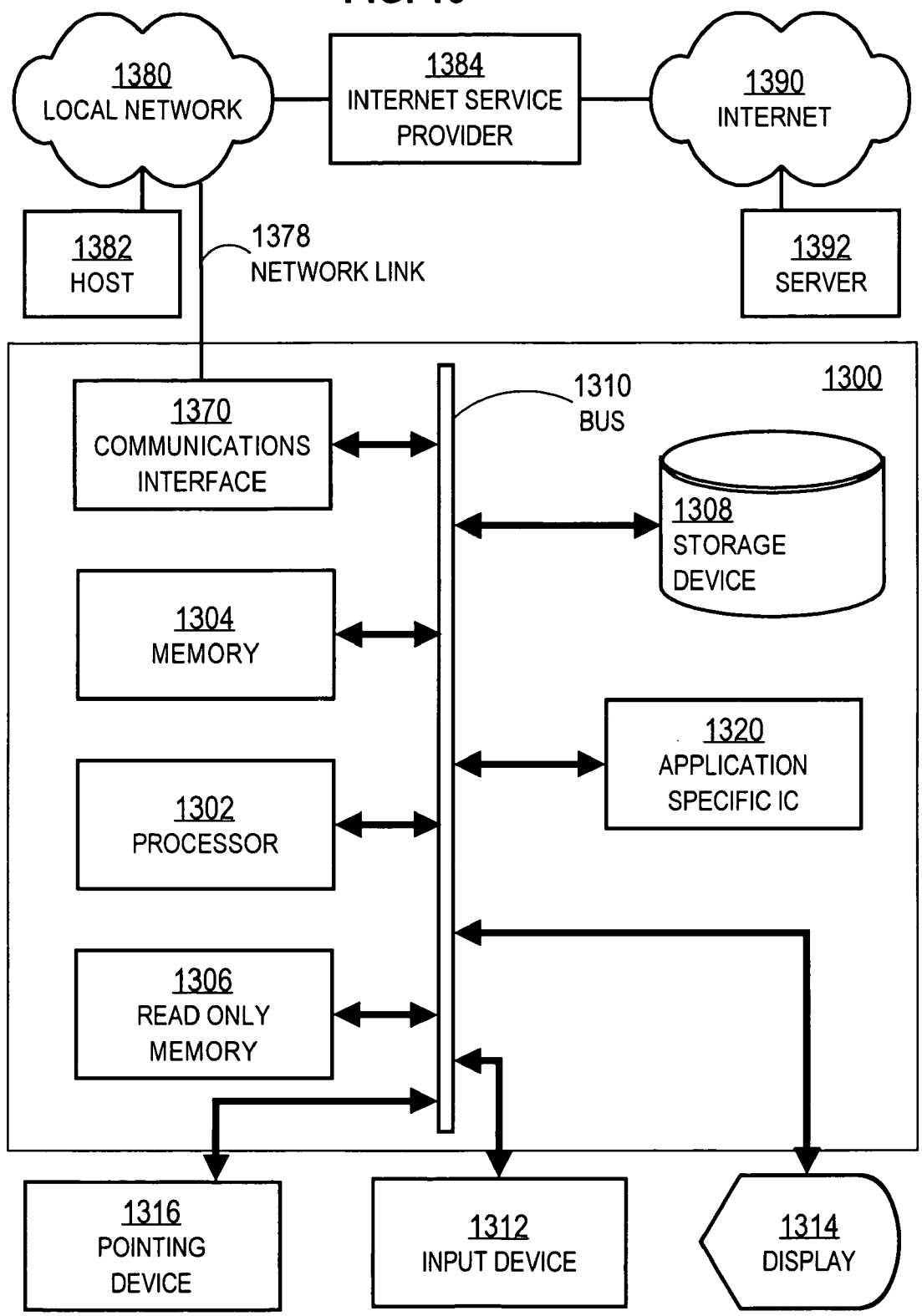

METHOD AND APPARATUS FOR DETECTING OPTICAL SPECTRAL PROPERTIES USING OPTICAL PROBE BEAMS WITH MULTIPLE SIDEBANDS

CROSS-REFERENCE TO RELATED APPLICATIONS

This application claims benefit of Provisional Appln. 60/675,348, filed Apr. 27, 2005, the entire contents of which are hereby incorporated by reference as if fully set forth herein, under 35 U.S.C. §119(e).

This application claims benefit as a Continuation-in-part of application. Ser. No. 11/036,491, filed 14 Jan. 2005, now U.S. Pat. No. 7,193,879, entitled "Techniques for Multiple Frequency Chirp Readout of Material with Inhomogeneously Broadened Absorption Spectrum" (hereinafter referenced as Merkel I), the entire contents of which are hereby incorporated by reference as if fully set forth herein, under 35 U.S.C. §120.

This application is related to U.S. patent application Ser. No. 10/515,089, filed 12 Nov. 2004, entitled "Method and Apparatus for Processing High Time-Bandwidth Signals Using a Material with Inhomogeneously Broadened Absorption Spectrum" (hereinafter referenced as Merkel II), the entire contents of which are hereby incorporated by reference as if fully set forth herein.

This application is related to U.S. patent application Ser. No. 11/179,765, filed 12 Jul. 2005, entitled "Techniques for Recovering Optical Spectral Features Using a Chirped Optical Field" (hereinafter referenced as Chang I), the entire contents of which are hereby incorporated by reference as if fully set forth herein.

STATEMENT OF GOVERNMENTAL INTEREST

This invention was made with Government support under Contract No. MDA-972-03-1-0002 awarded by the Defense Advanced Research Projects Agency (DARPA). The Government has certain rights in the invention.

BACKGROUND OF THE INVENTION

1. Field of the Invention

The present invention relates to optical spectroscopy, and in particular probing optical spectral properties of a target material or device using a probing optical beam with multiple frequency swept sidebands to determine the optical spectral properties of the target. Further the present invention relates to temporal mapping of the optical spectral features of a target material or device, achieving kilohertz ($10^3$ Hertz) resolution over many GigaHertz ($10^9$ Hertz) of bandwidth about an optical center frequency. As used herein, optical spectral properties refer to the frequency dependence of a physical property (such as absorption, reflection or resonance, among others) of a target in the optical frequency range from about ultraviolet ($10^{16}$ Hertz) to infrared ($10^{12}$ Hertz)

2. Description of the Related Art

Optical spectral properties of various materials and devices (called optical targets herein) are important in commerce. For example, the optical spectral properties of laser tuning cavities and materials are often determinative of the applications for which a laser can be deployed. In emerging technological fields, such as described in Merkel II, information is programmed into the optical absorption spectra of certain materials, such as inhomogeneously broadened transition (IBT) materials also called spatial-spectral (S2) materials or S2 holographic materials; and retrieving the information involves detecting the optical spectral properties of the programmed material. Such programmed materials offer the capacity to process high time-bandwidth product signals more accurately and quickly than existing methods, as described in Merkel II. High time-bandwidth product signals occur in a broad range of fields, from real-time spectral analysis and medical imaging, to optical ranging and communications, to photonic analog-to-digital conversion, to high resolution RADAR and LIDAR applications, among others.

One approach to detecting the optical spectral properties of a target is to probe the target with an optical beam that sweeps through a range of frequencies, a so-called optical chirp in analogy to the sound made by an acoustic signal that sweeps through a range of audible acoustic frequencies. The optical chirp may be constant in amplitude and linear in frequency with time or may be modulated in amplitude and non-linear in frequency over time. The measured temporal response of the target to the chirped probe beam gives an indication of the optical spectral content of the target.

Chang I and the journal article, Chang et al, Physical Review A, 70 063803 (2004), entitled "Frequency-chirped readout of spatial-spectral absorption features" (hereinafter referenced as Chang II, the entire contents of which are hereby incorporated by reference as if fully set forth herein) describe how mapping spectral absorption features into temporal intensity modulation using a chirped optical field depends on the chirp rate of the field. When probing an arbitrarily complex spatial-spectral grating with a chirped field, a beat signal representing the grating period can be created by interfering the emitted photon echo chirped field with a reference chirped field, regardless of the chirp rate.

In previous approaches, the probe optical beam has been a frequency chirp of the primary optical carrier. While suitable for many purposes, there can be disadvantages to this approach. For example, an acousto-optical modulator (AOM) may be used to create such a chirp, however these devices are limited in their chirping bandwidth to approximately 1 GHz. Another approach is to utilize a chirped external cavity diode laser (CECDL), which has been shown to chirp over wide bandwidth, however these devices do not currently offer sufficient inherent frequency stability of the chirped optical carrier, thus eliminating their capability of discriminating fine features of the target optical spectrum.

In another approach, described by Patent Cooperation Treaty (PCT) Application Serial No. PCT/US2004/014019, filed May 6, 2004 entitled "Method and Apparatus for Optical Broadband Frequency Chirp" (hereinafter referenced as Harris), an attempt is made to splice together multiple limited band chirps in an optical ring in order to produce a chirp with greater bandwidth. While suitable for some purposes, this approach can introduce phase mismatches at overlapping frequencies and add complexity to the process of detecting the optical spectral properties of a target.

Another approach is described by U.S. Pat. No. 4,297,035 entitled "Method and device for detecting a specific spectral feature" (hereinafter referenced as Bjorklund). Bjorklund resolves a spectral feature from a target optical spectrum by modulating an RF tone or chirp onto a stable optical carrier and detecting the RF modulation frequency. While suitable for some purposes, this approach suffers from a requirement of utilizing photo detectors and digitizers with an equivalent bandwidth to the RF chirp or tone that is applied to the optical carrier. As described in Merkel I, it is well known that increasing the bandwidth of photo detectors and digitizers corresponds to an increasing noise floor of the device, thus making this approach impractical for analysis of broad band spectral features of interest here.

It is clear from the preceding description that there is a need for techniques that probe the optical spectral properties of targets without suffering one or more of the disadvantages of the prior approaches. In particular, there is a need for techniques to perform spectral-to-temporal mapping with high resolution over large bandwidths.

SUMMARY OF THE INVENTION

Techniques are provided for detecting optical spectral properties using optical probe beams with multiple chirped sidebands.

According to one set of embodiments, a method for detecting optical spectral properties of a target includes determining for an optical chirp probe beam attributes of each of multiple sidebands that have amplitudes sufficient to be detected at a detector. The sidebands are frequency bands arranged symmetrically around an optical carrier frequency. The attributes of a sideband include a start frequency, bandwidth and chirp rate. A probe beam is generated with the chirped sidebands and directed onto a target having a physical property with optical frequency dependence. An optical response signal resulting from an interaction between the probe beam and the target is detected. The optical frequency dependence of the physical property of the target is determined based on the optical response signal and the attributes of the sidebands.

In some embodiments of the first set, the method includes determining whether conditions are satisfied for unambiguous effects of the sidebands on the optical response signal. Determining the optical frequency dependence is performed only if it is determined that conditions are satisfied for unambiguous effects of the sidebands.

In some embodiments, a method for creating the probe beams involves electro-optic modulation of a continuous wave (cw) laser beam with a radio frequency (RF) chirp. To those skilled in the art, the resulting chirped optical sidebands and their characteristics are well understood.

In other sets of embodiments, an apparatus and computer-readable medium accomplish one or more steps of the above method.

These techniques allow the determination of the spectral content of a target optical spectrum during one or more optical interactions (including, for example, optical absorption, transmission, reflection, diffraction, dispersion and scattering) of the target optical spectrum with one or more of the chirped laser fields. Thus, these techniques allow spectroscopy using electro-optical modulators (EOMs). As described above, a target optical spectrum is a spectrum at optical frequencies that is included inherently in a material or device, or recorded by artificial action in a material or device, or formed in some combination. As used herein, optical fields are understood to include all types of high frequency propagating electromagnetic waves, including, but not limited to, visible, infrared and ultraviolet radiation. Physical properties with optical spectra can be any physical property with spectral dependence that modifies propagating optical fields.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1B is a block diagram that illustrates an arrangement of optical components for probing the example target;

FIG. 4C is a pair of aligned graphs that illustrate the relationship between multiple sideband chirps and two kinds of spectral gratings with even symmetry using an intermediate frequency (IF), according to some embodiments;

FIG. 6A is a block diagram that illustrates an experimental setup for recording and detecting delays, according to an embodiment;

FIG. 7A is a graph that illustrates a response signal, excited by a multiple sideband probe beam, and detected using the experimental setup of FIG. 6A and waveforms of FIG. 6B, according to an embodiment;

FIG. 7B, FIG. 7C, FIG. 7D, and FIG. 7E are graphs that illustrate results of processing the response signal of FIG. 7A, according to an embodiment;

FIG. 9A is a graph that illustrates a response signal, excited by a multiple sideband probe beam, and detected using the experimental setup of FIGS. 8A and 8B, according to an embodiment;

FIG. 9B, FIG. 9C, FIG. 9D, and FIG. 9E are graphs that illustrate results of processing the response signal of FIG. 9A, according to an embodiment;

FIG. 13 is a block diagram that illustrates a computer system upon which an embodiment of the invention may be implemented.

DETAILED DESCRIPTION

Figure 1A:
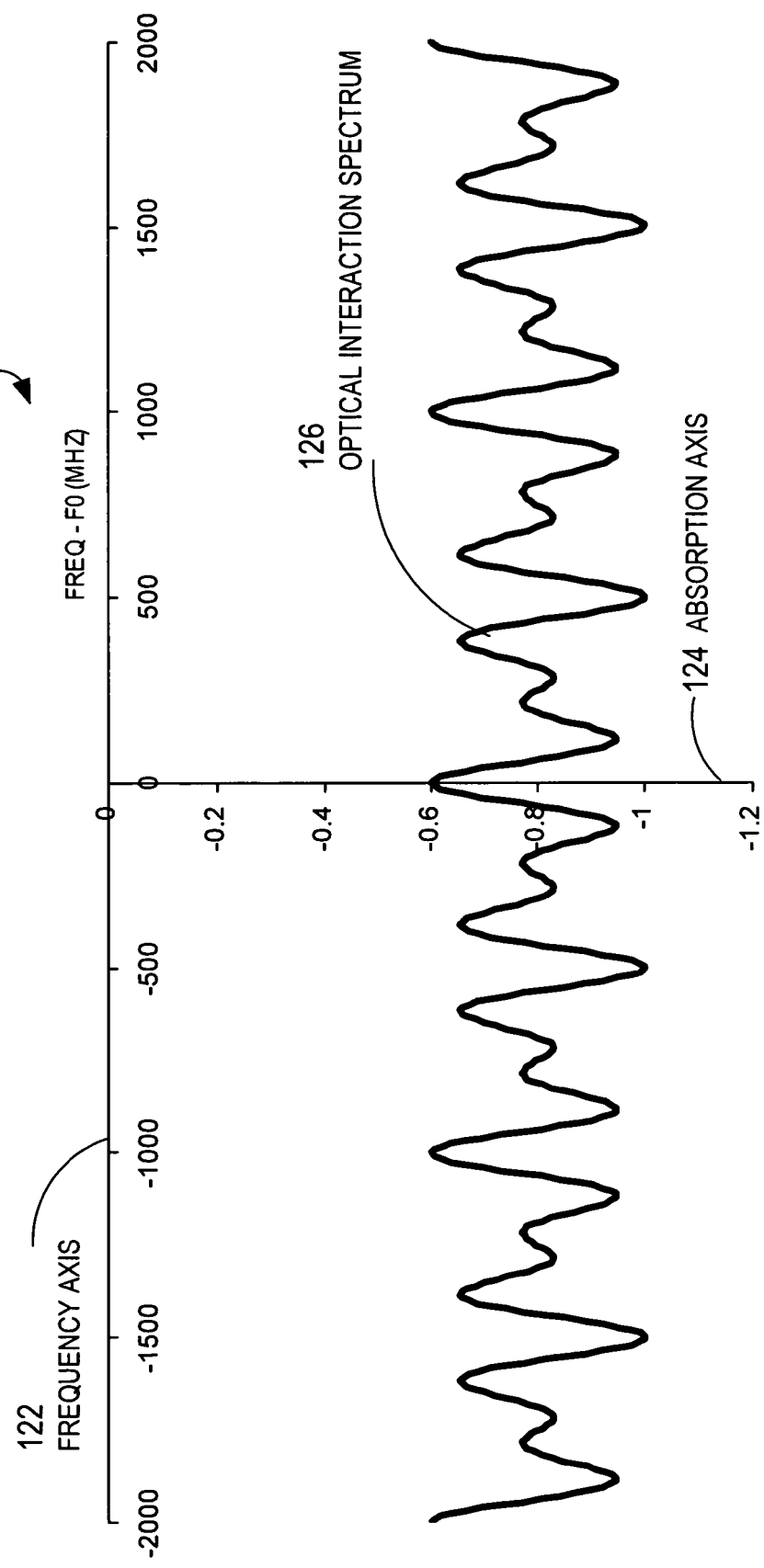
FIG. 1A is a graph that illustrates optical absorption with an optical frequency dependence in an example target.

Techniques are described for detecting optical spectral properties of a target using optical probe beams with multiple sidebands. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Most embodiments of the invention are descried below in the context of detecting the optical frequency dependence of optical absorptions previously programmed into an IBT material during an optical processing step. However, the invention is not limited to this context. In other embodiments, the optical frequency dependence is in another target, such as a cavity or spectral absorption hole for tuning or stabilizing a laser, or a crystal or integrated circuit chip, among others, or in another physical property of the target, such as reflection, diffraction, or resonance, among others.

1. Overview of Temporal Readout of Spectral Content

For purposes of illustration a simplified example of an optical frequency dependent physical property is described as a spatial-spectral grating in an IBT material which is measured by probing with an optical chirp to produce a temporal readout that is detected and used to determine the optical frequency dependence of the IBT material, i.e., the spectral content. The effects and advantages of an embodiment of the invention can then be understood with respect to this example. In later sections, other experimental example embodiments are described.

For purposes of illustration, it is assumed that the bandwidth of interest of the spatial-spectral grating is 4 GigaHertz (GHz, 1 GHz=109 Hertz; 1 Hertz=1 cycle per second) around a center optical frequency f0 (i.e., the band of interest spans f0−2 GHz to f0+2 GHz). The center optical frequency f0 is typically several to thousands of terahertz (THz, 1 THz=$10^{12}$ cycles per second). It is further assumed that the target optical spectrum has two periodic components of interest. These components are recognized as oscillations of absorption in the absorption spectrum with a periodicity equal to 333.3 MHz and 200 MHz. These spectral gratings may represent the interaction of a first optical signal with a second signal having two delayed near-replicas of the first optical signal, as described in [Merkel II]. The first delay, τ1, is 0.003 microsecond (μs, 1 μs=$10^{-6}$ seconds); and the second delay, τ2, is 0.005 μs. These delays are selected for simplicity of illustration only, and both shorter and much longer delays are anticipated in typical embodiments. These delays appear in the spatial-spectral grating as oscillations of absorption in the absorption spectrum, with periods given by the reciprocals of the respective delays. This relationship is given by Equation 1

$$P=1/\tau \qquad (1)$$

wherein P is the period (in units of frequency) of a spectral component in a spatial-spectral grating which corresponds to a particular delay τ. This period P is noteworthy in that it is a period in frequency rather than a period in time—it is a property of the Fourier transform that two spikes delayed in time, such as a reference spike and a reflected spike delayed by τ, corresponds to a period P in frequency.

FIG. 1A is a graph 100 that illustrates the spectral content of this example spatial-spectral grating. The frequency axis 122 represents frequency deviation, in MHz, from the central processing frequency f0, increasing to the right. The absorption axis 124 represents an absorber population inversion, where −1 represents the original population of absorbers, all ions in their ground state (the opposite of complete inversion), 0 represents equal numbers of ions in the ground and excited states (normal absorption), and +1 represents a state in which all absorbers are in their excited state (complete inversion), so that gain is present. This definition causes a spectral hole in absorption to appear as a spike in a plot of population inversion. The example two periodic components in frequency caused by the interaction of the signal with its two delayed replicas of equal strength form an optical interaction spectrum. The example optical interaction spectrum 126, depicted in FIG. 1A, includes a sum of an oscillating absorption with a period P1 of 333 MHz and an oscillating absorption with a period P2 of 200 MHz corresponding to the two delays τ1, τ2, respectively. In the illustrated example, the two components are sinusoidal functions of equal amplitude that are evenly distributed around the central optical frequency f0.

Note that the frequency axis 122 indicates less than 2000 MHz deviations from the optical center frequency f0 which has a value of several THz (millions of MHz); therefore every frequency in graph 100 is an optical frequency in the THz range. Ideally, a linear optical chirp of bandwidth Bc=4000 MHz and slow enough chirp rate (γ) will produce a temporal signal that maps the spectrum 126 into time. The bandwidth Bc and chirp rate γ are related by the duration Tc of the chirp, as described in Equation 2.

$$\gamma = Bc/Tc \qquad (2)$$

It is shown in Chang, Chang II, and Chang et al, Opt Lett., 30 1129 (2005)—the entire contents of which are hereby incorporated by reference as if fully set forth herein) that in general there is no restraint or limitations on the chirp rate γ for reading out the spectral content of IBT features. When probing a spatial-spectral grating with a chirped field, a beat signal representing the grating period can be created by heterodyne detecting (interfering) the emitted photon echo chirped field with a reference chirped field, regardless of the probe chirp rate. When probing spectral features coherent ringing may be de-convolved from the final readout spectra during post processing. In embodiments with IBT targets, the lifetime of the spectral content is limited, and the readout process should be completed before the spectral content decays to baseline conditions.

In the case of probing a spatial-spectral grating using the aforementioned heterodyne detection scheme, a temporal signal is produced that can be detected by high dynamic range, low bandwidth optical detectors currently available. In the heterodyne detection scheme, a delayed response signal is made to interact with the a reference signal of similar bandwidth to produce low frequency beats with frequencies on the order of the difference between the frequencies of the response and the reference. The probe beam is often used as a reference. The temporal changes in amplitude of the low frequency signal are easily detected by current optical detectors with high dynamic range and converted to electrical signals that are readily recorded by a processor, such as a general purpose computer.

FIG. 1B is a block diagram that illustrates an arrangement of optical components for probing the example target using heterodyne detection in a readout system 140. The system 140 includes the target 148 with the spatial-spectral grating to be detected, a probe source 142, an output optical coupler 143, a low-bandwidth detector 144, a low-bandwidth digitizer 145 and a processor 146.

The target 148 is, for example, an IBT material programmed to contain a spatial-spectral grating with spectral features to be determined by the readout process, as described above with respect to FIG. 1A. In the illustrated example, previous to readout, the IBT material serving as target 148 is pre-programmed to contain spectral features to be determined by the readout process. In some embodiments, the features are spectral only. In some embodiments, the features include a spatial-spectral grating that is formed by the interaction of multiple programming waveforms incident on the IBT material along different spatial modes. As used herein, a spatial mode of an optical beam in the IBT material is a position and direction of propagation of the optical beam in the IBT material. A spatial mode in the IBT material is designated by its vector wavenumber, represented by the symbol k. In some embodiments, the spatial-spectral grating is formed by the interaction of multiple programming waveforms along different spatial modes. In the current illustrated example, the spatial-spectral grating includes, at a particular spatial location, the optical interaction spectrum 126 depicted in FIG. 1A formed by two programming signals.

The probe source 142 generates an optical probe beam 151 to determine the spectral content of the spatial-spectral grating in the IBT material of target 148. In the current illustrated example, the optical probe beam 151 is a linear optical chirp. For chirped spectral-to-temporal mapping, the linewidth of the probe source, $\Gamma_L$, desired to accurately resolve a minimum target spectral feature $\delta v$, is $\Gamma_L < \leq \delta v$ as measured over the timescale of the chirp, Tc. The optical probe beam 151 is directed by an optical coupler (not shown) into the target 148 along a probe spatial mode designated by its vector wavenumber $k_p$. The optical coupler (not shown) is any combination of components known in the art that are used to direct an optical beam, such as free space, lenses, mirrors, beam splitters, and optical fibers.

The output optical coupler 143 directs the transmission output signal 152 and the delayed echo 154 for further processing. The output echoes can be coherently combined with a reference signal to form a heterodyne low bandwidth beat signal at the detector. The transmission output or a separate reference chirp similar to the probe (not shown) can be used as this reference signal. Any method known in the art at the time the system 140 is assembled may be used to couple the output echo signals with the reference signal so that they are combined and are spatially coherent to form a low-bandwidth beat signal at the detector. In the illustrated embodiment, among others, the transmission and one or more echoes are directed by optical coupler 143 so that they are combined at the detector 144 to form a heterodyne detectable signal with one or more low-bandwidth beat frequencies. The optical coupler 143 is any combination of components known in the art that are used to direct an optical beam, such as free space, vacuum, lenses, mirrors, beam splitters, and optical fibers In some embodiments, the transmission and echo are emitted from the target 148 in different spatial modes, as displayed in FIG. 1B. This occurs, for example, when the programming optical signals had interacted in an IBT material along different spatial modes, e.g., when k1 is different from k2. In embodiments with more than two processing signals that interact among more than two different spatial modes, echoes in more than one spatial mode may appear. In some such embodiments, the probe signal is aligned with either k1 or k2 or some other probe spatial mode designated by vector wavenumber kp. The transmission and echo are emitted in directions predicted by phase matching the wavenumbers k1, k2, kp. Similarly, in some embodiments, the coherent response from probing a feature is phese-matched.

In some embodiments, the transmission and echo are emitted from the IBT material in the same spatial mode. This occurs, for example, when the programming optical signals interacted in the IBT material along the same spatial mode, e.g., when there is only a single direction of programming, with k2=k1. In such cases the transmission and delayed echo are collinear and inherently combined coherently on the detector to produce a heterodyne low-bandwidth beat signal. In some embodiments, such as when a spectral hole is burned in the IBT material, there may be no distinct echo. In some such embodiments a coherent transient response occurs that distorts the shape of the readout spectral hole. Nonetheless, the characteristics of the spectral hole can be determined based on the distorted shape. In embodiments with no distinct echo or with echo and transmission signal inherently combined (e.g. spectral only gratings), the optical coupler 143 simply directs a single optical beam output from the target 148 onto the detector 144; in some such embodiments the optical coupler 143 may simply be composed entirely of free space.

In some embodiments, the optical coupler 143 combines the delayed echo 154 at detector 144 with a reference signal, such as an attenuated replica of the probe beam 151, instead of the transmitted signal 152 to produce the heterodyne output.

Detector 144 measures the intensity of an optical beam impinging on the detector. Any method known in the art and capable of measuring the temporal features of interest may be used as the detector 144. For example, some detectors generate a voltage proportional to the intensity of light impinging on the detector within the entire optical frequency band (several THz). In the illustrated embodiment, a high-dynamic range, low-bandwidth (~10 MHz) detector is used as detector 144 to produce a low-bandwidth temporal trace of voltage that is proportional to the intensity of the optical low-bandwidth heterodyned optical signal.

Digitizer 145 transforms an analog signal from detector 144 into digits that can be processed by a digital processor. In some embodiments, detector 144 and digitizer 145 are combined in a digital light sensor. In some embodiments, subsequent processing is done with an analog processor; and digitizer 145 may be omitted. In the illustrated embodiment, a high-dynamic-range low-bandwidth digitizer is used as digitizer 145.

Processor 146 uses the measured trace, proportional to intensity, to determine the spectral features of the spatial-spectral grating. In the illustrated embodiment, processor 146 determines the two beat frequencies $F_B$ (0.012 MHz and 0.020 MHz), such as by performing a Fourier transform of the detected output, and derives the two delays (0.003 μs and 0.005 μs, respectively) based on those $F_B$ and the chirp rate of the probe signal, γ=4 MHz/μs. In various embodiments, the processor 146 is a digital processor, an analog processor, or some combination of digital and analog processors. Digital components of a processor are often programmable by software, and an overview of hardware for a programmable processor is provided in a later section. In embodiments with a programmable processor, the processor 146 includes software executed by the hardware.

According to Merkel II, highly linear, phase continuous, frequency stable, wideband optical frequency chirps with the appropriate chirp rate are desired as the probe waveform in probe beam 151 for the readout process from probe source 142.

As discussed in an earlier section, the currently known techniques for producing optical frequency chirps with an appropriate level of linearity, stability in frequency, and optical wavelength independence are limited to techniques which suffer bandwidth limitations.

2. Probe Beams with Multiple Sideband Optical Chirps

According to embodiments of the invention, a probe beam (e.g., beam 151) with multiple sideband chirps is directed onto the target (e.g., target 148). For example, according to some embodiments of the present invention, probe source 142 includes a device, such as an electro-optic amplitude modulator (EOM) or electro-optic phase modulator (EOPM), that produces multiple sideband chirps; and probe beam 151 includes two or more of the sideband chirps and possibly the optical carrier.

To further illustrate some embodiments of the invention, a theoretical framework for the generation of multiple sideband chirps and their interaction with spectral properties of a target are described here. Embodiments of the invention are not limited by this description of theory.

In general the techniques described here have to date utilized linear, radio frequency source generators (RFSG), however the technique is not restricted to linear RFSG and in general any means known to create an radio frequency (RF) sweep could be utilized including non-linear RFSG where the non-linearity is measurable and a technique to calibrate or post process it as a correction measure may be employed.

Broadband electro-optic phase modulators, driven by a RFSG voltage $V_o \cos(2\pi f_m t)$ will produce sidebands on an optical carrier spaced at integer multiples of the modulation frequency, $f_m$, as is well known. These sidebands can be swept linearly (or non-linearly) in frequency by simply adding on the correct time dependent phase term as described by R. Reibel, Z. Barber, J. Fischer, M. Tian, and W. R. Babbitt, "Broadband demonstrations of true-time delay using linear sideband chirped programming and optical coherent transients," J. Lumin., vol. 107, pp. 103-113, 2004, the entire contents of which are herby incorporated by reference as if fully set forth herein and referred to as Reibel. Thus, for linearly chirping sidebands the electric field of the modulated optical signal is given by Equation 3.

$$E = E_o \cos(2\pi f_l t + \beta \cos(\pi\gamma t^2 + 2\pi f_s t)) \quad (3a)$$

where Eo is the field amplitude, fl is the unmodulated laser frequency, fs is the chirp start frequency at t=0 for the first order sidebands, $\beta=\pi V_o/V_{90}$ is an electro optic modulation coefficient, where Vπ is the voltage required by the modulator to produce a π phase shift, and γ is the chirp rate defined as in Equation 1. Equation 3a can be expanded in terms of Bessel functions as $$E = E_o \sum_{n=-\infty}^{\infty} J_n(\beta)\cos(2\pi(f_l - nf_s)t - n\pi\gamma t^2 + n\pi/2). \quad (3b)$$

Written in this way, it is apparent that the total electric field is made up of multiple linearly chirping fields, each with a start frequency with respect to the carrier of nfs and a chirp rate of nγ, as well as the n=0 optical carrier. Such a set of optical fields, when chirped linearly, are described here as multiple linear sideband chirps (MLSC).

Figure 2A:
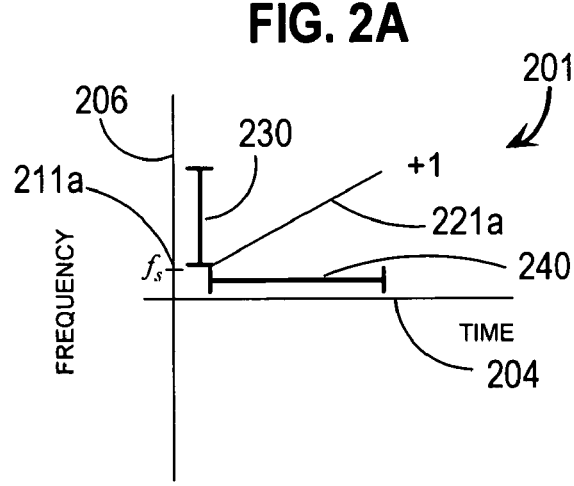
FIG. 2A is a graph that illustrates a single sideband optical chirp used as a probe beam.

FIG. 2A is a graph 201 that illustrates a single sideband optical chirp used as a probe beam, similar to the probe beams described above. Graph 201 includes a horizontal time axis 204 that indicates time increasing to the right from an arbitrary start time. Graph 201 also includes a vertical frequency axis 206 that indicates frequency deviations from an optical carrier frequency increasing upwards. The zero frequency deviation is indicated by the vertical position of the time axis 204. Plotted on graph 201 is a single sideband linear chirp 221*a* that increases linearly in frequency from a start frequency fs at vertical position 211*a*. The chirp 221*a* has a bandwidth Bc indicated by the frequency range 230 on graph 201 and a duration Tc indicated by the time range 240 on graph 201. This sideband chirp is labeled "+1" indicating it is the first order harmonic, positive frequency deviation, designated hereinafter as the +1 sideband chirp. The first order harmonic is sometimes called the first order chirp or first harmonic chirp.

For purposes of illustration, and for many practical embodiments it can be assumed that β=1 so $J_0(\beta) \cong 1$ and $J_{\pm 1}(\beta) = \pm \beta/2$, and all other terms are negligible. Thus the beam is described by a strong carrier frequency with two weak first order frequency chirped sidebands. Such a set of optical fields are described here as double-sideband (DSB) optical chirps. It is noted that the above assumption is an approximation and that effects due to higher order sidebands may contribute to a measurable response.

Figure 2B:
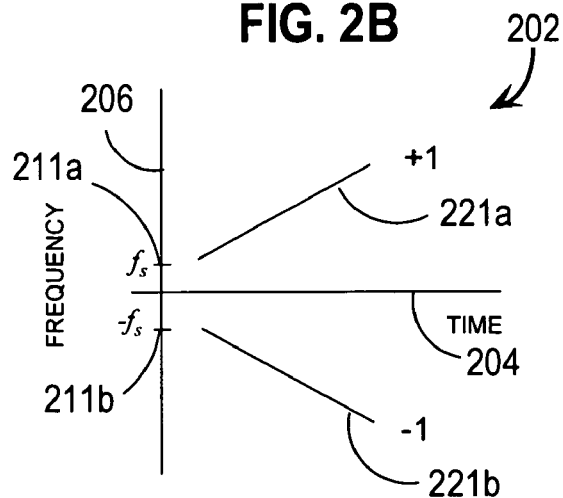
FIG. 2B is a graph that illustrates a double sideband optical chirp used as a probe beam, according to an embodiment.
Figure 2C:
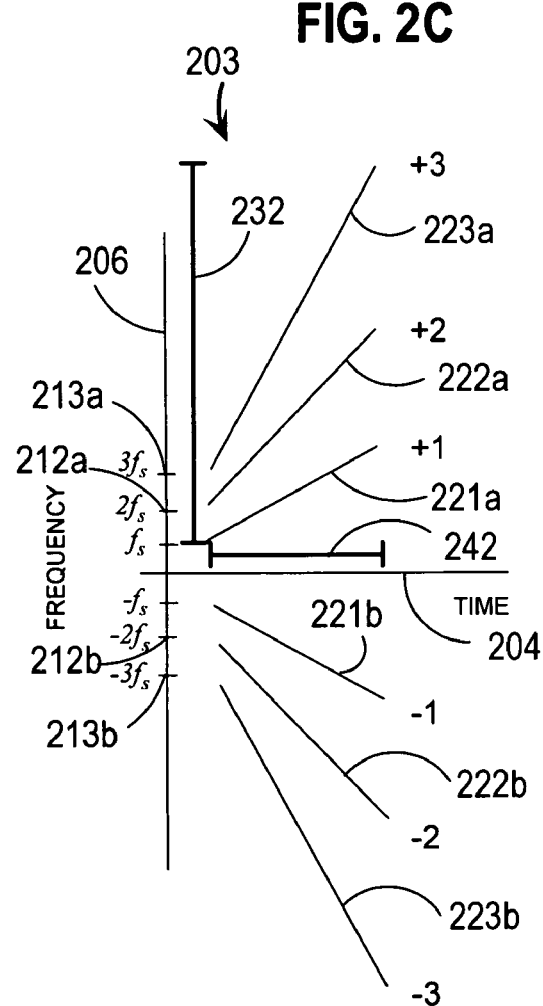
FIG. 2C is a graph that illustrates a double sideband optical chirp and two pair of higher order harmonic sidebands used as a probe beam, according to an embodiment.

FIG. 2A through 2C show the relationship between a single sideband chirp, multiple sideband chirps where only the positive and negative first order chirps are present, and multiple sideband chirps where higher order chirps are present, such as produced by an EOPM, respectively. For purposes of illustration, linear optical chirps that change frequency linearly with time are shown, but the invention is not limited to linear optical chirps and their sidebands.

FIG. 2B is a graph 202 that illustrates a double sideband optical chirp used as a probe beam, according to an embodiment. The time axis 204, frequency deviation axis 206, start frequency 211*a*, and +1 sideband chirp 221*a* are as described above in FIG. 2A. Also plotted on graph 202 is another sideband chirp 221*b*. This sideband chirp is labeled "−1" indicating it is the first harmonic, negative frequency deviation, designated hereinafter as the −1 sideband chirp. The −1 sideband chirp is a symmetric reflection of the +1 sideband chirp with the zero frequency deviation horizontal line as the axis of symmetry. The symmetry leads to a descending frequency chirp starting at a frequency deviation of −fs at vertical position 211b. The duration of the double-sideband optical chirp is the same Tc indicated by the time range 240 in FIG. 2A. Furthermore, the bandwidth is doubled, including two separated frequency bands each equal in magnitude to the bandwidth indicated by the frequency range 230 in FIG. 2A. Note that if the start deviation frequency fs is zero, the two frequency bands are contiguous at zero frequency deviation, rather than separated. For purposes of illustration, embodiments with non-zero start deviation frequency fs are described below.

FIG. 2C is a graph 203 that illustrates a double sideband optical chirp and two pair of higher harmonics sidebands used as a probe beam, according to an embodiment. The time axis 204, frequency deviation axis 206, +1 sideband chirp 221a, −1 sideband chirp 221b, and start frequency positions 211a, 211b are as described above. Also plotted on graph 203 are two higher harmonic sideband chirps 222a, 223a and their symmetric counterparts, 222b, 223b, respectively, constituting two more symmetric pairs of sideband chirps. The sideband chirp 222a is labeled "+2" indicating it is the second harmonic (i.e., second order), positive frequency deviation, designated hereinafter as the +2 sideband chirp. The +2 sideband chirp has double the frequencies of the +1 sideband chirp; therefore the +2 sideband chirp begins at 2fs as indicated by the vertical position 212a and has twice the bandwidth indicated by the frequency range 230 in FIG. 2A. The sideband chirp 222b is labeled "−2" indicating it is the second harmonic, negative frequency deviation, designated hereinafter as the −2 sideband chirp. The −2 sideband chirp is the reflection of the +2 sideband chirp and begins at −2fs as indicated by the vertical position 212b. The sideband chirp 223a is labeled "+3" indicating it is the third harmonic (i.e., third order), positive frequency deviation, designated hereinafter as the +3 sideband chirp. The +3 sideband chirp has triple the frequencies of the +1 sideband chirp; therefore the +3 sideband chirp begins at 3fs as indicated by the vertical position 213a and has triple the bandwidth indicated by the frequency range 230 in FIG. 2A. The sideband chirp 223b is labeled "−3" indicating it is the third harmonic, negative frequency deviation, designated hereinafter as the −3 sideband chirp. The −3 sideband chirp is the reflection of the +3 sideband chirp and begins at −3fs as indicated by the vertical position 213b.

Figure 3:
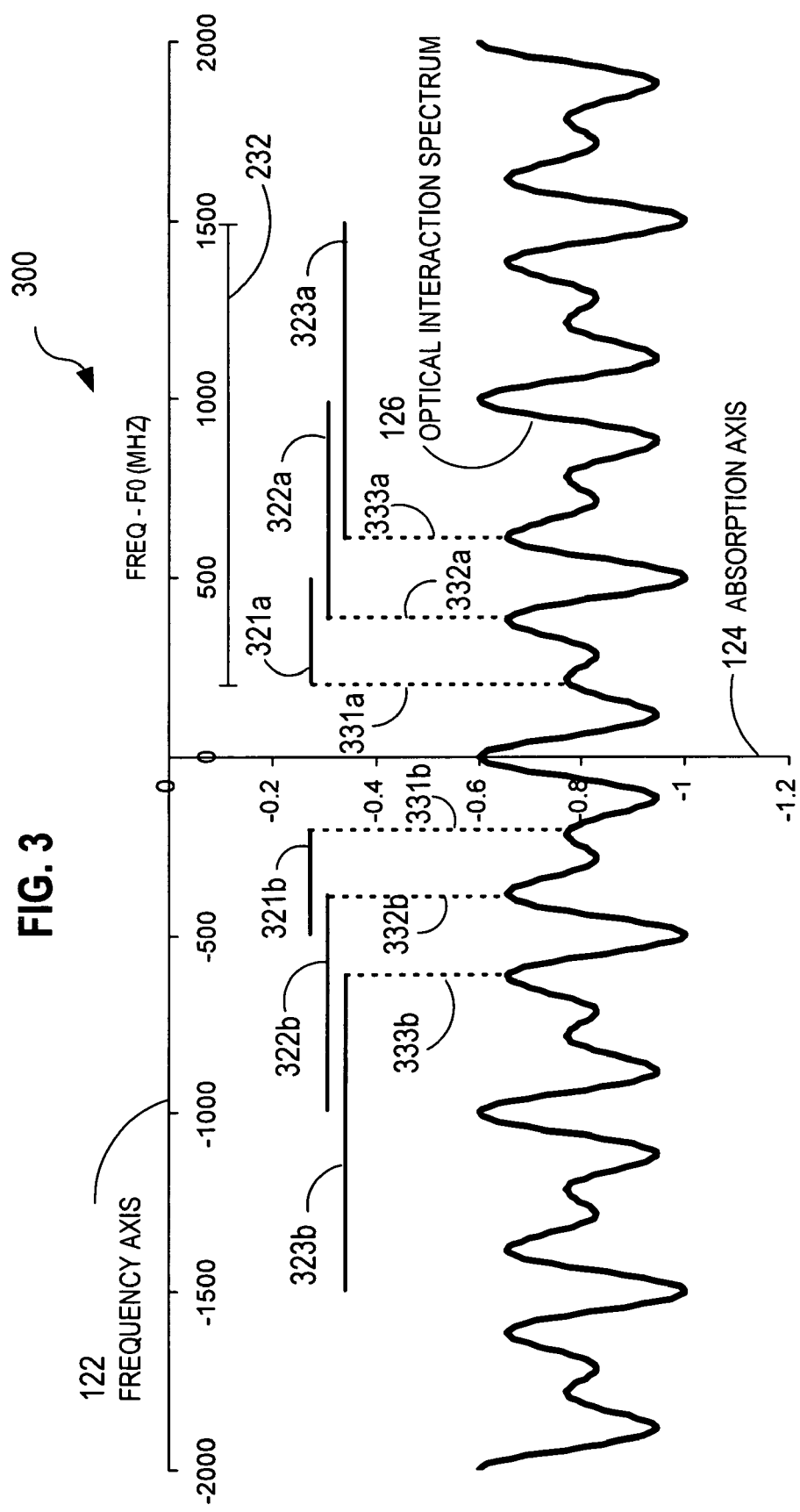
FIG. 3 is a graph that illustrates the simultaneous coverage of the optical frequency dependence of FIG. 1 using the pair of sideband chirps for each of the first three harmonics.

FIG. 3 is a graph 300 that illustrates the simultaneous coverage of the optical frequency dependence of FIG. 1A using a pair of symmetric sideband chirps for each of the first three harmonics. The axes 122, 124 and optical interaction spectrum 126 are as described above with reference to FIG. 1A. Also plotted on graph 300 as horizontal bars at arbitrary vertical positions are the deviation frequency ranges of the symmetric sideband pairs for the first three harmonics. Horizontal bar 321a indicates the frequency range of the +1 sideband chirp and horizontal bar 321b indicates the frequency range of the −1 sideband chirp. Similarly, horizontal bars 322a, 322b, 323a, 323b indicate the frequency ranges of the +2 sideband chirp, −2 sideband chirp, +3 sideband chirp and −3 sideband chirp, respectively. The bandwidth of the positive deviation frequencies is indicated by the frequency deviation range 232 as indicated above with reference to FIG. 2C.

For purposes of illustration it is assumed that the +1 sideband chirp has a start deviation frequency of 200 MHz and a bandwidth Bc of 300 MHz and a duration of 75 micro seconds ($\mu s$, 1 $\mu s=10^{-6}$ seconds). Such a chirp is easily produced with good frequency resolution, $\Gamma_L$, and stable characteristics by current EOMs and EOPMs.

A consideration in using the higher bandwidth of a multiple sideband chirp in a probe beam is the timing and phase of the features carried by the response beam output by the target after excitation by the probe beam. To indicate this effect, the portion of the optical interaction spectrum 126 illuminated by the multiple sidebands at the start of the chirp duration is indicated by the vertical dashed lines in FIG. 3. The start frequency of the +1 sideband chirp represented by range 321a is given by the horizontal position of the dashed line 331a. Similarly, the start frequencies of the other sideband chirps represented by ranges 321b, 322a, 322b. 323a, 323b are given by the horizontal positions of the dashed lines 331b, 332a, 332b, 333a, 333b, respectively.

The response excited by such a probe beam and measured by a detector will therefore produce an output that simultaneously reflects the amplitudes of the optical interaction spectrum at all of the points on that spectrum intersected by the dashed lines. Such a simultaneous response can lead to ambiguity as to the contribution by each sideband and therefore ambiguity as to the actual amplitude of the target spectrum at a particular frequency. In this example, it is desirable to determine how the total response at one instant is to be apportioned among the six frequencies that correspond to that instant on the six sidebands.

3. Conditions for use of Probe Beams with Multiple Sideband Optical Chirps

According to some embodiments of the invention, multiple sideband chirps are used as optical probe beams under conditions to avoid the ambiguity of simultaneous detection of responses corresponding to multiple frequencies.

One such condition can be illustrated with graph 300 of FIG. 3. The optical interaction spectrum 126 is an even function of the frequency deviation (f−f0) and is thus symmetric about the zero deviation frequency (f=f0). Each harmonic pair is also symmetric about the zero deviation frequency. Thus if a single harmonic pair is used, the time evolution of each response from both symmetric sidebands are aligned, and the measured signal is unambiguously associated with both frequency ranges. To see this for the symmetric pair of the third harmonic, note that a trace of the optical interaction spectrum 126 proceeding to the right of dashed line 333a is identical to the trace proceeding to the left of dashed line 333b.

An advantage of using both symmetric sidebands simultaneously is that the signal strength increases, allowing any detector to be more efficient in detecting the response waveform.

According to various embodiments of the invention, constraints on the target spectral content or symmetry of target or probe beam are exploited to make use of multiple sideband chirps.

3.1 Target Symmetry

In some embodiments, it is determined whether the frequency dependence of interest in the target has symmetry around the central optical carrier frequency of the probe beam such that the spectral information is duplicated in frequency on both sides of the optical carrier frequency (f0), as shown above for the example optical interaction spectrum 126. This condition is called target spectrum symmetry and is designated condition C1. This condition can readily be satisfied in many embodiments where the target spectrum is recorded in an IBT material on the same optical carrier used to produce the multiple sideband probe beam.

In some embodiments, it is further determined whether the spectral information that has target symmetry is also limited in spectral range, such that it only overlaps with the sidebands of the same harmonic. We call condition C1 with this additional condition, condition C1A. If so, then those harmonic sidebands produce a similar electric response on a photo-detector. Unlike the condition described above with reference to FIG. 3, in which the sidebands of one harmonic were somehow isolated from other harmonics, this condition specifies that the spectral content of interest in the target reside in the pair of sidebands for one and only one harmonic. Such would be the case if the spectral content of interest in the optical interaction spectrum 126 were confined to the portion of range 323a that extends beyond range 322a or confined to the portion of range of 323b that extends more negative than range 322b, or confined to both portions.

In some embodiments, it is further determined whether the spectral information that has target symmetry also is such that when either all or a subset of sidebands are detected on the same detector simultaneously, they produce a similar electric response or temporal evolution. We call condition C1 with this additional condition, condition C1B. An example of such a condition comes from the creation of spectral gratings using temporally overlapped, frequency offset multiple sideband optical chirps such as those described in Reibel. Here the grating period for each higher order harmonic is proportional to the order of the harmonic. In such a situation, if a multiple sideband optical chirp, similar to one of the two used to create the spectral gratings, is used to probe these gratings, each chirped sideband will probe its respective spectral grating at a rate proportional to its harmonic number. Because the period of the grating at each of the multiple sideband optical chirps is also proportional to the harmonic number, the resultant echo signal at each of the harmonics is given the same delay. The corresponding heterodyned signals on the optical detector from each harmonic thus have the same beat frequency or electric signal and thus have the same temporal evolution.

3.2 Frequency Discrimination

In some embodiments it is determined whether the frequency dependence of interest in the target is in bands that are spaced in frequency in such a way that each transmitted sideband chirp can be subsequently discriminated from one another using frequency dependent spatially diffractive devices or filtering techniques. This condition is called target frequency discrimination and is designated condition C2. For example, assume two spectral features were spaced approximately 20 GHz apart. Assume also that the multiple order sideband chirps probe these features such that the +1 harmonic and −1 harmonic each overlap one of the two features. After probing these features, the multiple order sideband chirps impinge upon a spatial grating with enough frequency resolution, such that the +1 and −1 order chirps are sent into separate spatial directions, detected and post processed independently.

3.3 Spatial Discrimination

In some embodiments it is determined whether the frequency dependence of interest in the target is in bands that are spaced in frequency in such a way and recorded using spatially distinct beams such that phase matching requirements of each set of features produce spatially distinct transmit beams for each different order harmonic chirp. This condition is called target spatial discrimination and is designated condition C3. For example, under certain situations as described by Reibel in "High Bandwidth Optical Coherent Transient True Time Delay", PhD Dissertation, Montana State University, 2002 (hereinafter Reibel II, the entire contents of which are hereby incorporated by reference as if fully set forth herein), spectral gratings programmed with multiple order sideband chirps can each have distinct phase matching requirements. In such a situation, a multiple order sideband chirps probing these gratings would send a photon echo output in a distinct spatial direction for each spectral grating read out. Each of these echoes could then be heterodyned independently with an independent reference beam and detected by an independent photodetector.

3.4 Target Asymmetry

In some embodiments it is determined whether the frequency dependence of interest in the target is asymmetric around the central optical carrier frequency such that the information resides on only one side of that carrier. This condition is called target asymmetry and is designated condition C4.

In some embodiments, it is further determined whether the spectral information that has target asymmetry is also limited in spectral range, such that it only overlaps with the sidebands of the same harmonic. We call condition C4 with this additional condition, condition C4A. In this case only a single sideband produces an electric response, so there is no mixing of responses from several sidebands and the response is unambiguous. For example, a target spectrum that extends only through negative deviation frequencies below range 322b satisfies condition C4A.

3.5 Separately Measurable Spectral Features of No Interest

In some embodiments it is determined whether the frequency dependence of interest in the target has certain non useful or otherwise detrimental spectral features that are recorded prior to engraving spectral information for discovery. It is further determined whether the certain non useful or otherwise detrimental spectral features are such that they can be removed during a corrective stage, or that a reference beam is used to probe a region where similar non useful or detrimental spectral features exist such that a balanced detection can occur for a corrective stage. This condition is called separately measurable spectral features of no interest and is designated condition C5. For example, assume that the material in which the desired spectral features exist has a defect that causes what appears to be a spectral hole near the desired spectral features. Assume that before the desired spectral features were recorded, a multiple order optical chirp probed that region, and the spectral defect was recognized and recorded. Then after probing the desired spectral features with a similar multiple order optical chirp, the detected signal could be post processed with a simple subtraction algorithm to remove the detrimental effect of the defect apparent spectral hole.

4. Example Embodiments

Example embodiments are described in this section. For purposes of illustration, in most examples the physical property is optical absorption and the optical frequency dependence is a periodic (ideally sinusoidal) absorption feature known as a spectral grating. Spectral gratings are well known and described in the art of physical properties exhibiting optical frequency dependence. In some embodiments, the spectral grating records the timing between two waveforms that were applied to the IBT material. Because these features can be created in a variety of ways, there are several ways that they can be read out with multiple sideband optical chirps.

Spectral grating features can also be created on an intermediate frequency (IF) carrier around a central optical carrier. In such a situation, the spectral gratings may have limited spectral content and will be symmetric around the central carrier and the IF. Here creation of such gratings is known as IF processing. Such a set of IF created gratings are depicted in FIG. 4A along with a baseband processing spectrum for comparison.

Figure 4A:
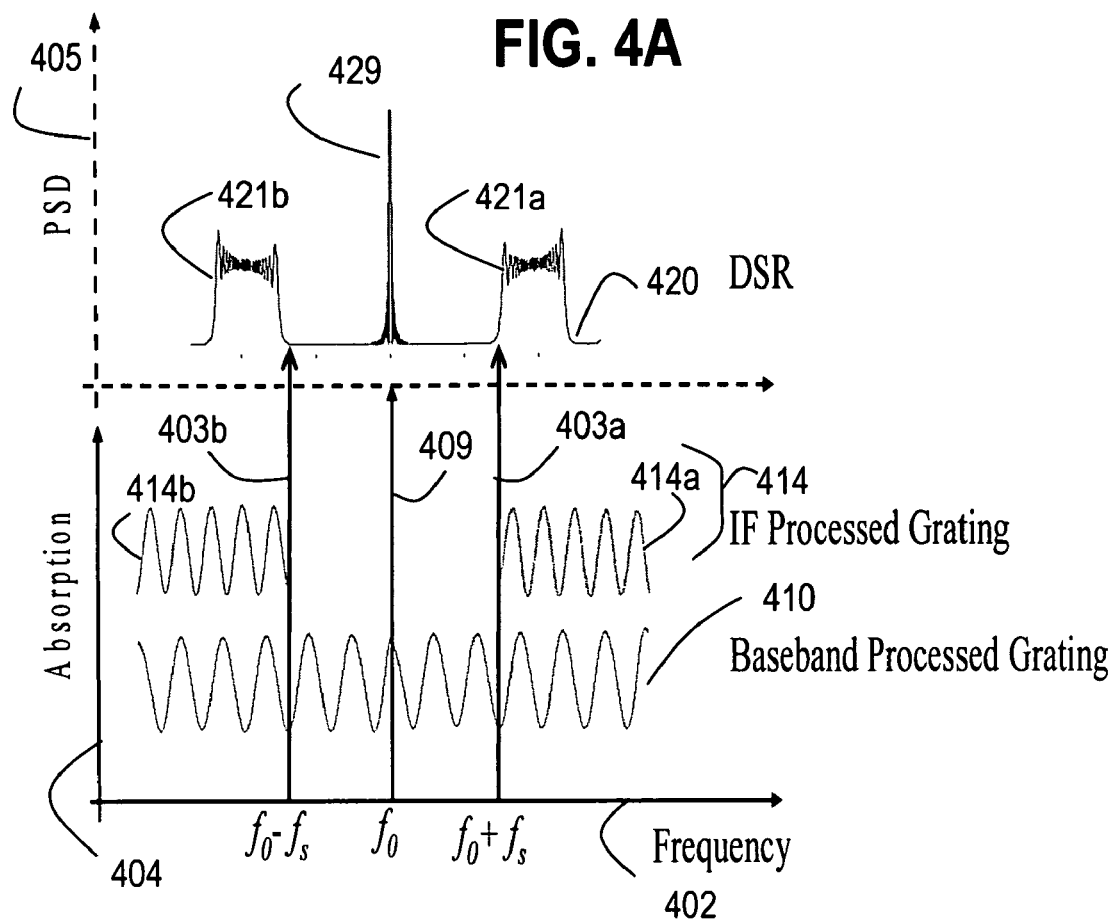
FIG. 4A is a pair of aligned graphs that illustrate the relationship between multiple sideband chirps and two kinds of spectral gratings with even symmetry, according to some embodiments.

FIG. 4A is a pair of aligned graphs that illustrate the relationship between multiple sideband chirps and two kinds of spectral gratings with even symmetry, according to an embodiment. The aligned graphs share a horizontal frequency axis 402 The lower graph has a vertical absorption axis 404 and the upper graph has a vertical power spectral density (PSD) axis 405. The lower graph shows a baseband spectral grating 410 that is an even sinusoidal function around $f_0$, representing a particular delay between programming signals as described in Merkel II. The lower graph shows an IF spectral grating 414 that is an even sinusoidal function around $f_0$ with a gap at frequencies close to the central carrier frequency separating portions 414a and 414b. The baseband and IF spectra are offset vertically in order to avoid one spectrum obscuring the other. The upper graph shows the frequency components of a multiple sideband optical chirp waveform 420, where only the first order sidebands are shown, called here a dual sideband readout waveform (DSR), used as a probe beam to detect the absorption spectra. In the DSR is evident the carrier frequency represented by the peak 429 at frequency f0 represented by the vertical arrow 409. Also evident in the DSR are the +1 sideband 421a starting at frequency f0+fs represented by vertical arrow 403a, and the −1 sideband 421b ending at frequency f0−fs represented by vertical arrow 403b.

As can be seen, the IF created gratings 414a, 414b are an even function around the optical carrier f0. Thus these IF gratings can be measured using a DSR which provides the enhanced readout bandwidth, frequency resolution, signal strength and allows a two to one mapping of frequency structure to the time domain. This case is again representative of symmetry case C1 above.

Although the spectral gratings shown have constant amplitude, this need not be the case. In fact, the spectral grating, or for that matter any spectral structure can be read out with arbitrary amplitude. Again, when reading out spectral structure, the DSR can accurately represent a mapping of the spectral structure when the spectral structure's phase and envelope are even functions about the optical carrier used to create the readout chirps. An example of a situation where a spectral grating has a non-constant amplitude as a function of frequency is shown in FIG. 3. This situation is also representative of symmetry condition C1, described above.

Figure 4B:
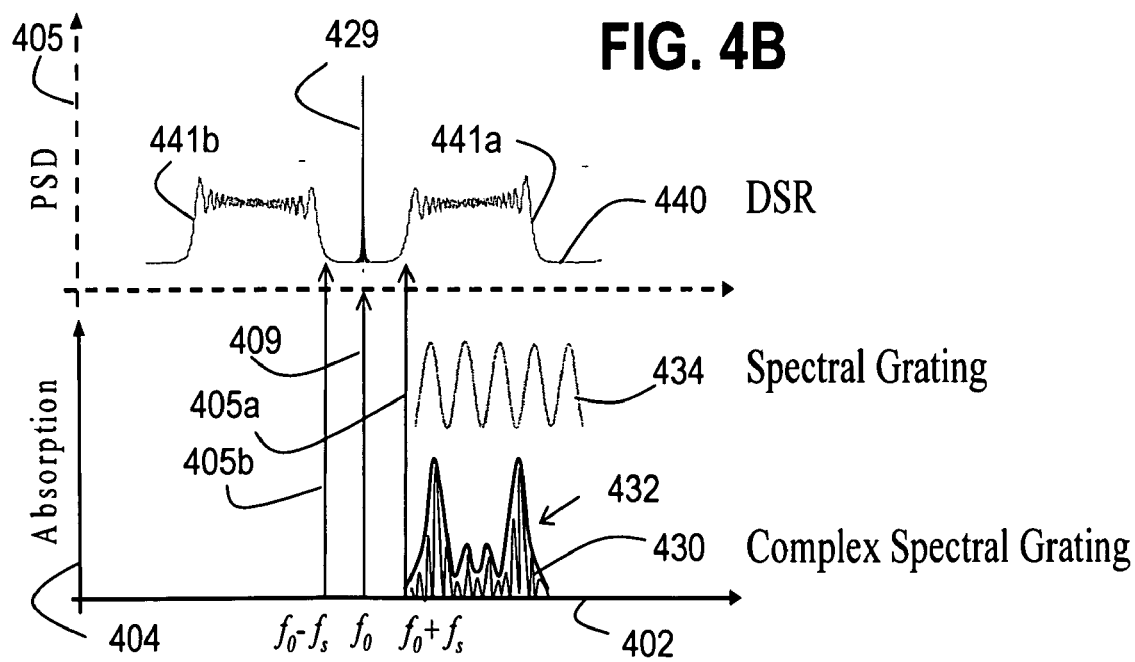
FIG. 4B is a pair of aligned graphs that illustrate the relationship between multiple sideband chirps and two kinds of spectral gratings with asymmetry, according to some embodiments.

The multiple sideband optical chirp readout technique will work if a single chirped sideband (the upper first order chirp for example) or any one side of the chirped sideband spectrum (all or a portion of the upper sidebands for example) overlaps with the spectrum of interest. Shown below in FIG. 4B is a generalized schematic of this situation where an arbitrary spectral structure overlaps in frequency with only the first order upper sideband chirp. This case is representative of asymmetry condition C4, described above.

FIG. 4B is a pair of aligned graphs that illustrate the relationship between multiple sideband chirps and two kinds of spectral gratings with asymmetry, according to an embodiment. The horizontal frequency axis 402, vertical absorption axis 404 and PSD axis 405, optical carrier peak 429 and vertical arrow 409 at frequency f0 are as describe above, with reference to FIG. 4A. The lower graph shows asymmetric, varying amplitude spectral grating 430 and an asymmetric constant amplitude spectral grating 434 that appear only at positive frequencies deviations from the optical carrier frequency f0. The two absorption spectra are offset vertically in order to avoid one spectrum obscuring the other. The upper graph shows the frequency components of a DSR 440 used as a probe beam to detect the absorption spectra. Evident in the DSR are the +1 sideband 441a starting at frequency f0+fs represented by vertical arrow 405a, and the −1 sideband 441b ending at frequency f0−fs represented by vertical arrow 405b. Thus these asymmetric gratings can be measured using DSR even though such measurements use only one chirped sideband.

The DSR technique may also be applied on an IF carrier. FIG. 4C is a pair of aligned graphs that illustrate the relationship between multiple sideband chirps and two kinds of spectral gratings with even symmetry, according to an embodiment. The horizontal frequency axis 402, vertical absorption axis 404 and PSD axis 405, optical carrier peak 429, vertical arrow 409 at frequency f0, and spectral grating 410 are as describe above, with reference to FIG. 4A. The lower graph shows symmetric, constant amplitude spectral grating 450 that includes portions 450a, 450b, 450c, 450d. The IF absorption spectra are offset vertically form the spectral grating 410 in order to avoid one spectrum obscuring the other.

The upper graph shows the frequency components of a DSR waveform 460 on an IF carrier of frequency fIF that is then modulated on the optical carrier at frequency f0. DSR 460 is used as a probe beam to detect the absorption spectra. Evident in DSR 460 are the optical carrier peak 429 and the IF modulation peaks 428a, 428b at frequency f0+fIF represented by vertical arrow 408a and at frequency f0−fIF represented by vertical arrow 408b. Also evident in the DSR are the +1 sideband 461a and −1 sideband 461b on either side of IF carrier frequency f0+fIF, and the +1 sideband 461c and −1 sideband 461d on either side of IF carrier frequency f0−fIF.

In this embodiment, an RF linear frequency chirp is mixed onto an IF frequency, prior to the EOM. In this case the DSR technique is still valid so long as spectral overlap symmetry requirements are met, as depicted in FIG. 4C. For example, baseband processing or IF processing may occur during programming, and one may employ DSR readout on an IF carrier so long as there is symmetry about both the optical laser frequency and the IF carrier frequency. Such spectral symmetry may occur, for example in the radar range-Doppler processing on any radar band reported in Merkel II.

4.3 Detection of a Readout Signal

In this section is presented an analysis specific to a particular embodiment in which the target is a baseband spectral grating programmed into an IBT, noting that other embodiments using other targets are analyzed in a similar manner, but with variations of the specific mathematical descriptions. Further, in order to illuminate the most fundamental aspect of this invention, the analysis is presented only for the carrier and first order chirped sideband terms.

The detected DSR fields may be written as the sum of the transmitted fields with a series of echo fields diffracted and time delayed by the S2 material. As is well known, the time delay is inversely proportional to the grating period. Previous work has shown that periodic spectral gratings are a useful basis set to describe arbitrary spectral features in an S2 material, and as such, the mathematical formalism here can be extended to describe such arbitrary features. This work is described in Chang II. The following is an analysis of the detected signal, when reading out a periodic spectral grating 410, as schematically depicted in FIG. 4A. From this are extracted symmetry relationships between the spectral grating and readout beam using multiple chirped optical fields. These symmetry principals hold for situations of reading out more complicated spectral features, as demonstrated by experiments described in following sections. This analysis can be extended to more complicated situations involving multiple sidebands and multiple gratings.

The detected signal may be written as proportional to the time averaged square of the total field, where averaging occurs due to the finite detector bandwidth, as presented in Equations 4a and 4b.

$$I_{Det}(t) \sim \langle |E_{Total}(t)|^2 \rangle_{\tau_{Da}} \tag{4a}$$

$$|E_{Total}(t)|^2 = |E_c(t)|^2 + |E_U(t)|^2 + |E_L(t)|^2 + |E_{Ue}(t)|^2 + \tag{4b}$$
$$|E_{Le}(t)|^2 + 2E_c(t)[E_U(t) + E_L(t) + E_{Ue}(t) + E_{Le}(t)] +$$
$$2E_U(t)E_L(t) + 2E_{Ue}(t)E_{Le}(t) + 2E_U(t)E_{Ue}(t) +$$
$$2E_L(t)E_{Le}(t) + 2E_U(t)E_{Le}(t) + 2E_L(t)E_{Ue}(t)$$

The detected field $E_{Total}(t)$, is a sum of the carrier ($E_c(t)$), upper and lower first order sidebands ($E_U(t)$ and $E_L(t)$ respectively), and the upper and lower echo fields ($E_{Ue}(t)$ and $E_{Le}(t)$ respectively), explicitly written as:

$$E_c(t) = A_c \cos(\omega_c t) \tag{4c}$$

$$E_U(t) = A_U \cos(\omega_c t + \omega_{Start} t + \pi\gamma t^2 + \phi_U) \tag{4d}$$

$$E_L(t) = A_L \cos(\omega_c t + \omega_{Start} t + \pi\gamma t^2 + \phi_L) \tag{4e}$$

$$E_{Ue}(t) = A_{Ue}(t-\tau) \cos(\omega_c t + \phi_{Uecho} + \omega_{Start}(t-\tau) + \pi\gamma(t-\tau)^2) \tag{4f}$$
$$w/\phi_{Uecho} = \phi_U + \phi_{UGrating}$$

$$E_{Le}(t) = A_{Le}(t-\tau) \cos(\omega_c t + \phi_{Lecho} + \omega_{Start}(t-\tau) + \pi\gamma(t-\tau)^2) \tag{4g}$$
$$w/\phi_{Lecho} = \phi_L + \phi_{LGrating}$$

where the expressions are written in angular frequency $$\omega = 2\pi f. \tag{4h}$$

For the case of phase modulation it is assumed $$A_U = -A_L \equiv A_1 \text{ and } A_{Ue} = -A_{Le} \equiv A_e. \tag{5a}$$

The phase relations $\phi_U$, $\phi_L$, $\phi_{UGrating}$ and $\phi_{LGrating}$ represent the phase of the upper and lower sidebands and upper and lower portions of the spectral grating, relative to the laser carrier $\omega_c$.

The number of mixing terms expressed in equation 4b that contribute to a time varying current from the detector can be reduced assuming that an alternating current (AC) coupled photo-detector is used eliminating the direct current (DC) mixing terms, i.e., $$|E_c(t)|^2 + |E_U(t)|^2 + |E_L(t)|^2 + |E_{Ue}(t)|^2 + |E_{Le}(t)|^2 \approx 0 \tag{5b}$$

and that the detection bandwidth is less than the start frequency of the applied RF frequency sweep, stated as $BW_{Det} < \omega_{Start}$, time averaging the cross mixing terms to zero, i.e., $$2E_U(t)E_L(t) + 2E_{Ue}(t)E_{Le}(t) + 2E_L(t)E_{Ue}(t) + 2E_L(t)E_{Ue}(t) = 0 \tag{5c}$$

and $$2E_c(t)(E_U(t) + E_L(t) + E_{Ue}(t) + E_{Le}(t)) = 0 \tag{5d}$$

leaves only the upper sideband chirp mixing with the upper sideband echo and the lower sideband chirp mixing with the lower sideband echo $$E_{Total}(t) = 2E_U(t)E_{Ue}(t) + 2E_L(t)E_{Le}(t) \tag{5e}$$

In such a situation, the detected signal may be expressed as, $$I_{Det}(t) \sim \langle |E_{Total}(t)|^2 \rangle_{\tau_{Da}} = \frac{A_1 A_e(t-\tau)}{2} \cos\left(\frac{\phi_{UGrating} + \phi_{LGrating}}{2}\right) \tag{5f}$$
$$\cos\left(\frac{\phi_{UGrating} - \phi_{LGrating}}{2} - \theta_{Chirp} - 2\pi\gamma t\tau\right)$$

If the grating phase is an even function about $\omega_0$ (as depicted in FIG. 4A), stated as $$\phi_{UGrating} + \phi_{LGrating} = 2N\pi \tag{6a}$$

or simply $$\phi_{UGrating} = -\phi_{LGrating}, \tag{6b}$$

the signal expressed in equation (5f) is maximized and then the detected signal will follow the simplified expression $$I_{Det}(t) \sim \frac{A_1 A_e(t-\tau)}{2} \cos(\phi_{UGrating} - \theta_{Chirp} - 2\pi\gamma t\tau), \tag{6c}$$

with $$\theta_{Chirp} = \omega_{start}\tau + \pi\gamma\tau^2 \tag{6d}$$

where $\tau$ is the delay time between the probe chirps and their respective echoes signals, which is the inverse period of the periodic spectral grating. Note the general expression of equation (5f) underlies the reasoning behind the aforementioned symmetry conditions. If exact symmetry does not exist, the amplitude of the detected signal will follow equations (5f). Note that the detected signal as represented by equation (6c) is an oscillation with a frequency that is equal to the inverse period of the spectral grating $\tau$, scaled by the chirp rate $\alpha$. Therefore, assuming the chirp rate is known, the detected signal represents a two to one mapping of two portions of the spectral grating to an equivalent signal on the photo-detector.

The above stated condition that $BW_{Det} < \omega_{start}$ reduces the complexity of the electrical signal after the photo-detector. However this condition is not necessary. If not satisfied, additional complexity of the electrical signal may be handled with digital post processing methods, and may contain relevant information which can further strengthen or enhance the knowledge of the spectral structure to be discovered. Note also that other mathematical formalisms can be described for various situations.

4.4 Optional Calibration and Correction Stages

In certain instances, where the spectrum of interest or the device under test overlaps with features that do not have interest, corrective action can be taken to eliminate the features of non-interest. For example, in some embodiments features of non-interest are digitally recorded before recording and reading out the feature of interest mixed with the features of non-interest. Then, utilizing a simple post-processing algorithm, the features of non-interest are eliminated via subtraction. A calibration stage is implemented in some embodiments in order to provide the user with accurate frequency mappings and readings as to their relative or absolute positions. In various embodiments, other corrective or calibration stages are implemented for optimal operation and no restrictions are anticipated on such use when appropriate.

As an example where correction could be employed, consider the DSR readout approach on an IF carrier as depicted in FIG. 4C of this document. Under certain conditions, the IF carrier could hop frequencies after each sweep, in order to access a larger aggregate bandwidth of interest. In such embodiments, if the IF is hopped such that the lower sidebands spectrally overlap with the upper sidebands of the previous sweep, then their spectral contribution can be corrected for, because the spectral contribution of the upper sideband is known from the prior sweep. Precise calibration methods are employed in some embodiments such as those described in Merkel I.

4.5 Generation of Multiple Sideband Linear Chirps

To demonstrate certain embodiments, high bandwidth chirping voltages have been created with a digital chirping signal created from a pulse-pattern generator (PPG). This is done by using an electronic pulse-pattern generator as if it were an electronic arbitrary waveform generator with only 1 bit of vertical resolution. In this situation, the electric field is written as $$E = E_o \cos(2\pi f_I t + \phi(t)) \quad (7a)$$

$$\phi(t) = \begin{cases} \beta & \text{if } \cos(\pi \gamma t^2 + 2\pi f_s t) > 0 \quad (7b) \\ -\beta & \text{if } \cos(\pi \gamma t^2 + 2\pi f_s t) \leq 0 \quad (7c) \end{cases}$$

From the well known sampling theorem (see, for example, B. P. Lathi, Modern Digital and Analog Communication Systems. New York: Oxford University Press, 1998, hereinafter Lathi, the entire contents of which are herby incorporated by reference as if fully set forth herein), any waveform which is bandwidth limited to $B_L$ can be reconstructed from a discrete set of samples taken at a rate R>2BL, where $R_N = 2B_L$ is the Nyquist frequency. Thus, assuming a suitably fast sampling rate, the PPG output spectrum up to the Nyquist limit is the same spectrum as the output of a typical arbitrary waveform generator (AWG) producing the same square wave. Of course some amount of over-sampling is preferred and four times over-sampling is expected to perform well for simple chirping functions (see Lathi). In the following demonstrations, the maximum instantaneous frequencies were kept below 3 GHz. The pulse-pattern generator had a sampling rate, R=12 GBit/s, thus maintaining a factor of four over-sampling.

Figure 5A:
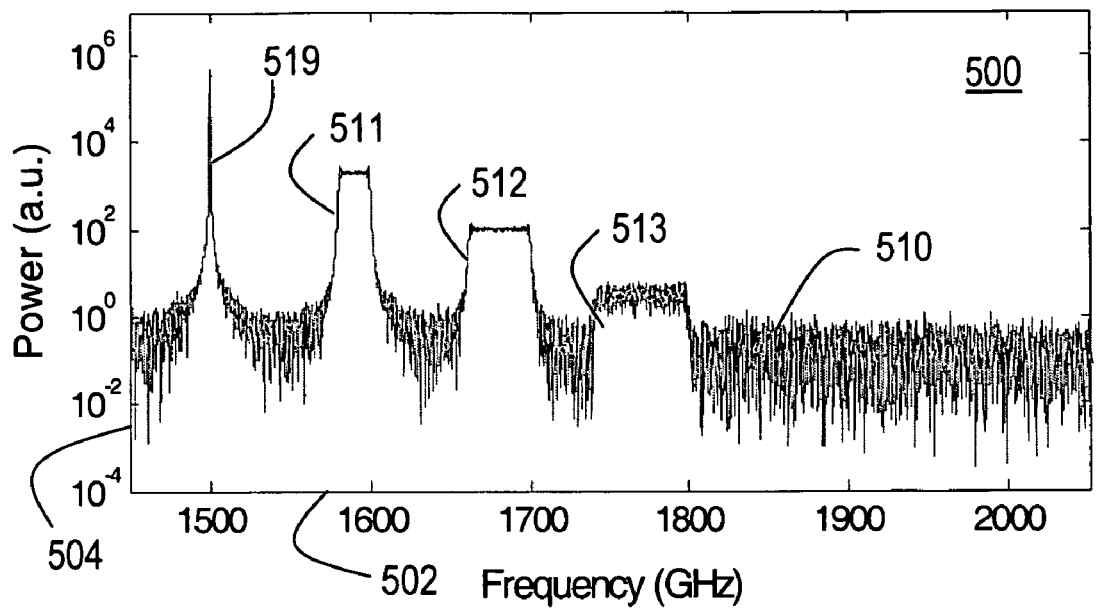
FIG. 5A is a graph that illustrates a three sideband chirps up to a third order harmonic; according to one embodiment.
Figure 5B:
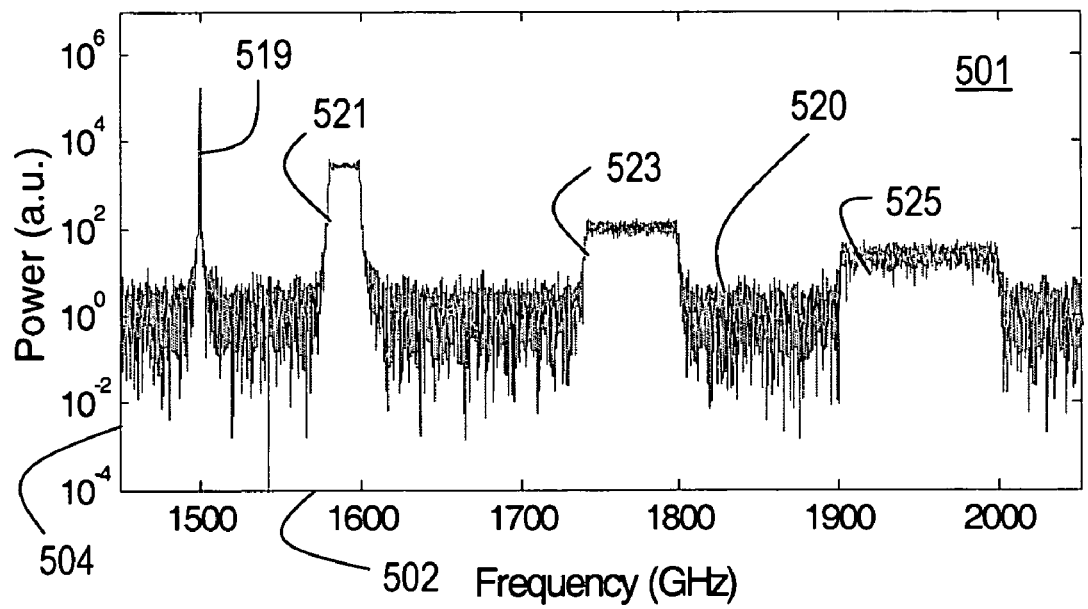
FIG. 5B is a graph that illustrates three sideband chirps up to a fifth order harmonic, according to an embodiment.

While the sampling rate would not limit the frequency resolution, an examination was made of how the inherent square wave nature of the waveforms produced with the PPG affects the frequency content of the chirps, as shown in FIG. 5A and FIG. 5B.

FIG. 5A is a graph 500 that illustrates three sideband chirps up to a third order harmonic; according to one embodiment. These sidebands were formed by a sinusoidally driven phase modulated optical field, as given by Equation 3a. Graph 500 has a horizontal Frequency axis 502 in units of GHz, and a vertical power axis 504 in arbitrary power units. Trace 510 represents frequency content computed using a fast Fourier transform (FFT) algorithm of a simulated electric field given by a chirped sinusoidal driving voltage. Only the positive (up-shifted) frequency deviations are shown. Trace 510 includes a peak 519 associated with the optical carrier, a +1 sideband 511, a +2 sideband 512, and a +3 sideband. Here f0=1500 GHz, fs=80 GHz, Bc=20 GHz, γ=2 GHz/ns, β=1.2 and phase noise was simulated on the waveform. The sinusoidal driving voltage produces all orders of sidebands as expected.

FIG. 5B is a graph 501 that illustrates three sideband chirps up to a fifth order harmonic, according to an embodiment. These sidebands were formed by a square wave driven phase modulated optical field. The Frequency axis 502 and power axis 504 are as described above for FIG. 5A. Trace 520 represents frequency content via FFT of a simulated electric field given by a chirped square wave driving voltage. Trace 520 includes the peak 519 associated with the optical carrier, a +1 sideband 521, a +3 sideband 523, and a +5 sideband 525. Here the same parameters are used. The effect of the square wave is to essentially transfer more energy out of the carrier into the odd order sidebands.

A comparison of the power spectra of the two different first order chirps 511, 521 plotted in FIG. 5A and FIG. 5B, respectively, shows identical frequency structure with only a change in the overall power contained within each chirp. Thus, either one of the first order linear sideband chirps created with an EOM and the PPG does not differ in any significant way from a true linear frequency chirp such as one created with a CECDL, an acousto-optic modulator (AOM), or even those created with EOMs with sinusoidal chirped driving voltages. Note that while the preferred embodiments utilize a single linearly frequency sweep from a suitable RFSG applied to the EOM, this is not a necessary condition, and in general, all that is desired is an a priori knowledge of the type or types of frequency sweeps (possibly non-linear) being applied to the EOM Other types of sweeps that could be utilized include second order (quadratic) frequency sweeps, or multiply toned frequency sweeps (such as those found by mixing a single RF chirp with an IF carrier), and even non-linear chirps, assuming that the non-linear nature is known a priori. All of these frequency sweeps can be created in a variety of ways, and no restrictions on the type of sweeps used are anticipated. Currently, COTS techniques can produce chirps using the digital approach described above to around 20 GHz of bandwidth. Using other techniques, such as mixing these chirps onto an RF carrier before applying them to the EOM can create multiple tone chirps with 20 GHz of bandwidth on any carrier out to beyond 100 GHz. Assuming a proper switching and filtering matrix is employed, near continuous chirps could be created with such an approach, by utilizing multiple carriers each mixing similar base band frequency sweeps.

4.6 Demonstration for Baseband Radar

In this demonstrated embodiment an S2 material is used as a coherent processor called "S2CHIP" as described in Merkel II in which time of flight range signatures are stored in the S2 material as periodic spectral gratings. To discover the period of these spectral gratings, and hence the delay between transmitted and returned signals that give a range, a single sideband readout chirp probe beam was described for the S2CHIP in Merkel II. In this section is described how a DSR chirp is applied as the probe beam to properly discover these features. Under the simplest conditions of the S2CHIP, symmetry occurs if one of the following conditions are satisfied (symmetry can also occur under other conditions).

First, there is symmetry if the "programming" laser, defined as the laser which is modulated to create the spectral features, is also used as the "readout" laser, defined as the laser which is modulated to read the spectral features. It is assumed for purposes of illustration that there has been no change or adjustment in the laser's oscillating frequency from either frequency instabilities of the source itself or external devices, such as acousto-optic modulators (AOMs) or deflectors (AODs) during programming or readout, Second, there is symmetry if the readout laser adjusts its frequency or phase appropriately, to compensate any shift or change in frequency or phase produced by the programming laser to maintain a point of symmetry with respect to the spectral features for intended readout.

In a particular variation of the S2CHIP device, where a spatial array of Doppler processing channels exists and simultaneous extraction of their content is desired, additional optical components and their supporting electronics, such as AODs, are used in order to create an appropriate array of modulated beams for simultaneous extraction of the information of interest. It is envisioned that similar devices, such as AODs and their supporting electronics, be used on the probe beam to shift the readout laser center frequency to a suitable spectral location to retain the requisite symmetry.

A proof-of-concept demonstration was performed at Spectrum Lab of Montana State University to verify that spectral features, such as spectral gratings, are read out using DSR. In this demonstration, temporally overlapped linear sideband chirps (LSC) were used to program spectral gratings. Spectral gratings programmed in this way are completely analogous to spectral gratings programmed by the S2CHIP device if the coding approach used linear frequency modulation codes (chirped codes). This programming approach has been utilized before to create symmetric broadband spectral gratings for true-time delay applications such as described in Reibel I.

FIG. 6A is a block diagram that illustrates an experimental setup 600 for recording and detecting delays, according to this embodiment. Setup 600 includes a source 620 for the programming and probe beams 681, an S2 material target 680, a detector 640 for heterodyne detection of a transmitted probe beam and a delayed echo response beam 682, a scope 650 for recording the detected signal and a computer 660 for both post-processing the detected signal and controlling the operation of the source 620.

Figure 6B:
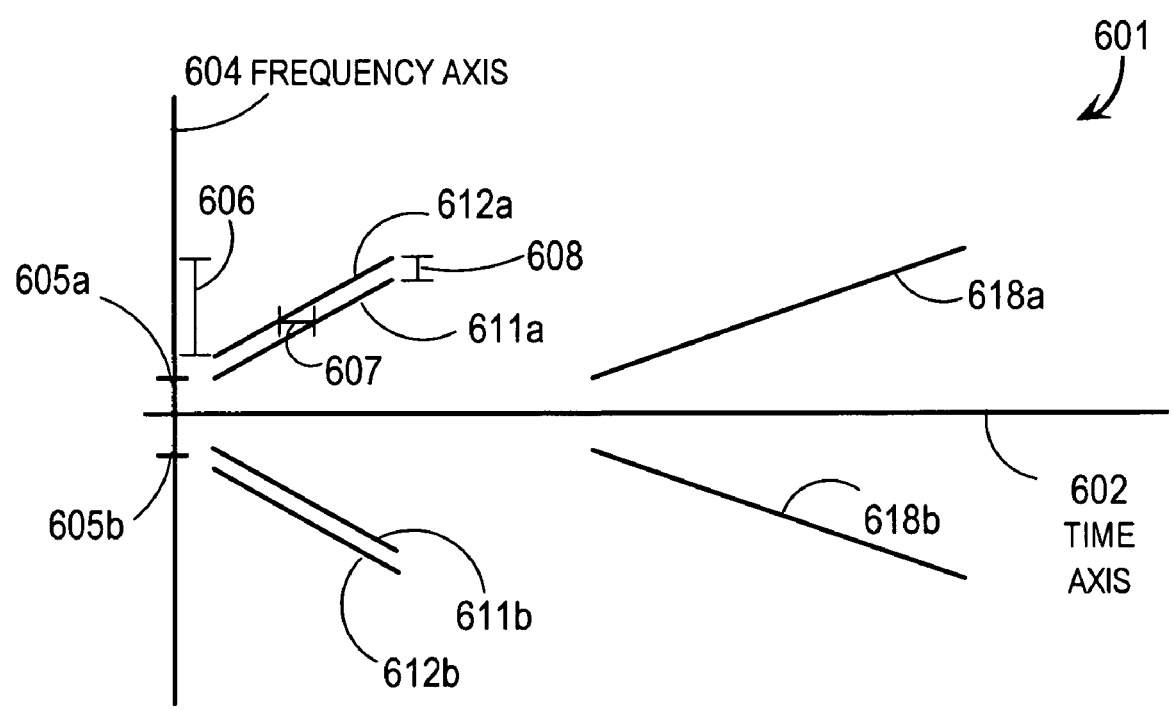
FIG. 6B is a graph that illustrates interacting spectra recorded in a material and the multiple sideband chirps in a probe beam for the experimental setup of FIG. 6A, according to an embodiment.

As can be seen, an external cavity diode laser 622 was utilized as a source. A portion of this laser was directed to stabilization system 624 by optical coupler 623 to stabilize the laser by locking to a regenerative spectral feature (see, for example, N. M. Strickland, P. B. Sellin, Y. Sun, J. L. Carlsten, and R. L. Cone, "Laser frequency stabilization using regenerative spectral hole burning.," Phys. Rev. B, vol. 62, pp. 1473-6, 2000, the entire contents of which are hereby incorporated by reference as if fully set forth herein). An AOM 627 was used to gate the source and carve out the optical pulses as shown in FIG. 6B, described below. AOM 627 was driven by an arbitrary waveform generator (AWG) 625 and amplifier 621a to provide amplitude control over both the programming and probe pulses. These pulses then passed into EOM 628 to undergo frequency modulation. Here the EOM 628 was driven by PPG1 626a and PPG2 626b whose outputs were summed in optical coupler 629, and then amplified in amplifier 621b. PPG1 produced a first digital programming chirp, with the lower start frequency, and also produced the readout digital chirp. PPG2 produced the second digital programming chirp with a higher start frequency. After mixing, amplification and application to the EOM 628, the frequency offset, temporally overlapped programming LSC and probe DSR were focused to a spot about 100 μm in size in a target 680. The target 680 was an S2 material of 0.1% Tm:YAG held at a temperature about 5 Kelvin(K) in a cryostat. The temporally overlapped LSC produced symmetric spectral gratings for each order within the material, which were subsequently read out by the optical DSR. In this collinear geometry, the delayed echo pulses already spatially overlap with the transmitted version of the readout pulse and both 682 are focused onto a New Focus 1801 AC coupled detector 640. The readout signal was digitized with a Tektronix TDS-3054 oscilloscope 650 and subsequently stored on a computer 660 for post-processing.

FIG. 6B details the approach by illustrating only the first order sidebands. FIG. 6B is a graph 601 that illustrates interacting spectra recorded in a material and the multiple sideband chirps in the DSR probe beam for the experimental setup of FIG. 6A, according to an embodiment. Graph 601 includes a horizontal time axis 602 with time increasing to the right from an arbitrary start time. Graph 601 includes a vertical frequency axis 604 with frequency deviations from an optical carrier frequency increasing upwards from zero at a vertical position of the time axis 602. Plotted on graph 601 are the frequencies of modulated laser pulses generated by source 620 of FIG. 6A. A programming pulse is generated at an earlier time with two temporally overlapped chirps 611a, 612a and their symmetric sidebands 611b, 612b. A DSR probe pulse is generated at a later time with one linear sideband chirp (LSC) 618a and its symmetric sideband 618b.

Single sideband LSCs 611a, 611b together constitute multiple linear sideband chirps (MSLC) 611; similarly single sideband LSCs 612a, 612b together constitute MSLC 612. MCLS 612, 611 generically represent a transmitted and returned radar signal, respectively. A particular frequency that appears in both chirps 611a, 6112a is separated in time by $\tau_D$ represented by temporal range 607. This represents the time delay to be stored in the S2 material. At a particular time, the frequencies between each of the same first order LSCs are separated by δf represented by range 608. The start frequency deviations for LSCs 611a, 611b are shown by the vertical positions 605a, 605b, respectively on frequency axis 604. The bandwidth B of each LSC is given by the frequency range 606. Single sideband LSCs 618a, 618b together constitute MSLC 618. The programmed bandwidth of LSC 618a encompasses the bandwidth 606 of each of the transmitted and returned radar LSCs 612a, 611a.

Thus the programming optical pulse consists of two temporally overlapped, frequency offset MLSC 612, 611, respectively, representing the transmit and receive radar waveforms. The time delay stored by the spectral grating is given by $$\tau_D = \delta f \tau_c / B \qquad (8)$$

Equation 8 relates time range 607 to frequency range 608. Here $\tau_c$ is the duration that the LSCs are on, as controlled by the AOM 627, and B is the bandwidth 606 over which the first order LSC sweeps.

In the demonstrated embodiment, the programming digital chirp from PPG1 626a had a bandwidth of 1.0 GHz, a start frequency of 1.1 GHz and a duration $\tau_c$ of 500 μs. PPG2 626b produced a similar programming digital chirp except its start frequency was offset by 0.5 MHz to produce a stored delay $\tau_D$ 607 of 1 μs. PPG1 also produced the probe digital chirp that had a 1.0 GHz bandwidth, a start frequency of 1.1 GHz and a duration of 100 μs, giving a probe chirp rate of 10 MHz/μs.

FIG. 7A is a graph 791 that illustrates a response signal 710, excited by a multiple sideband probe beam, and detected using the experimental setup of FIG. 6A and waveforms of FIG. 6B, according to an embodiment. Graph 791 includes a horizontal frequency axis 702a based on time in a temporal readout signal. Time at the readout signal is converted to frequency deviations from an optical carrier for axis 702a based on the chirp rate of the probe beam. Graph 791 includes a vertical power axis 704a with power increasing upwards. Plotted on graph 791 is the heterodyne temporal readout signal 710 at detector 640 mapped to frequency deviations from an optical carrier in the target S2 material. A periodic component of trace 710 represents the delay between the MLSCs 611, 612.

Trace 710 shows the raw readout signal as captured by the TDS-3054 scope 650. The beginning ~100 MHz of the probe chirp saturated the detector and digitizer combination and thus was not recorded as can be seen in trace 710.

Figure 7D:
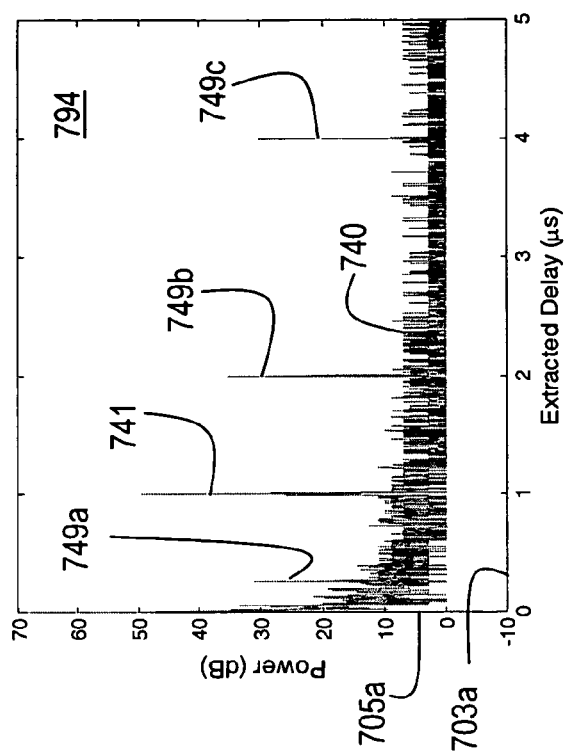

FIG. 7B, FIG. 7C, FIG. 7D, and FIG. 7E are graphs that illustrate results of processing the response signal of FIG. 7A, according to an embodiment.

A high pass filter was applied to the data to remove low frequency aberrations due to chirp amplitude changes due to the EOM and the resulting signal is plotted in FIG. 7B. FIG. 7B is a graph 792 that illustrates a trace 720 that is a high passed version of response signal 710. The horizontal axis 702a is as described above for FIG. 7A. The vertical axis 704b is power in the arbitrary units of FIG. 7A but at a much finer scale. Here the readout of the spectral grating can be seen to stretch from a start at about 1200 MHz out to 2100 MHz.

A portion of trace 720 is expanded and plotted in FIG. 7C. FIG. 7C is a graph 793 that illustrates a trace 730 that is an expanded view of trace 720. The horizontal axis 702b is a 50 MHz range of the horizontal axis 702a, described above for FIG. 7A. The vertical axis 704c is power in the arbitrary units of FIG. 7A but at a much finer scale. A strong periodic component is evident in trace 730 and is indicative of a primary delay $\tau_D$.

In order to examine the frequency content of the readout signal and provide the extracted delay from this data it is further post processed. Typically, the raw data is Fourier transformed and a plot of the power spectral density is created. FIG. 7D is a graph 794 that illustrates the Fourier transform of trace 720 as trace 740. Graph 794 includes a horizontal frequency axis 703a that indicates temporal delay extracted from the readout response signal in microseconds. Graph 794 includes a vertical power axis 705a with power increasing upwards. Plotted on graph 794 is the Fourier transform trace 740 of the high passed trace 720 in FIG. 7B. As can be seen in FIG. 7D, there is a very strong peak 741 at an extracted delay of 1 μs with a dynamic range of about 47 deciBels (dB). Also evident is another structure 749b at twice the delay which is likely a result of programming saturation of the S2 material. Also evident is a peak 749c at a delay near 4 μs that is the result of leakage light through one of the 80 MHz AOMs. A minor peak 749a at about 0.2 μs is not considered significant.

Figure 7E:
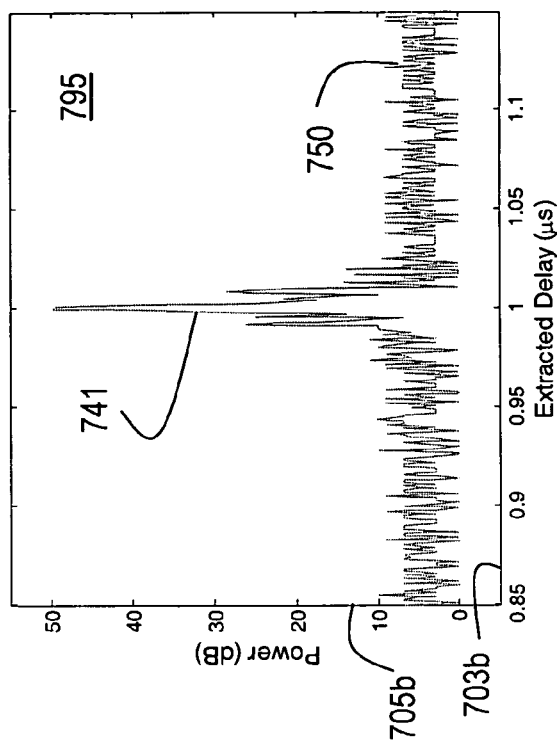

A portion of trace 740 is expanded and plotted in FIG. 7E. FIG. 7E is a graph 795 that illustrates a trace 750 that is an expanded view of trace 740. The horizontal axis 703b is a 0.3 μs range of the horizontal axis 703a, described above for FIG. 7D. The vertical axis 705b is power in the arbitrary units of FIG. 7DA but at a slightly finer scale. A zoom of the 1 μs peak 741 shows a 3 dB full width at half maximum (FWHM) of ~1.2 nanoseconds (ns, where 1 ns=$10^{-9}$ seconds). This corresponds well to the overall grating bandwidth that was actually recorded of about 875 MHz, which would provide a resolution of about 1.1 ns. Note also that fine details and structure, such as the sidebands around the peak seen at about 25 dB down, detail the high resolution of this process. That structure is most likely due to inherent noise features from the laser that were also observed on a spectrum analyzer, which provides information on the laser stabilization performance. Overall, this demonstration provides conclusive proof that DSR can be used to adequately determine the features of spectral gratings such as those from S2CHIP, with extremely high resolution.

4.7 Demonstration for Multiple Band Radar

A demonstration of DSR probe beam on an IF carrier was performed. Here two separate radar bands were used (S and X band). The S2CHIP directly processed these signals at their carrier frequencies, storing symmetric spectral gratings around the S and X band IF carriers. Subsequently, an RF frequency chirp was mixed to either the S or X band IF carrier creating the probe MLSCs.

Figure 8A:
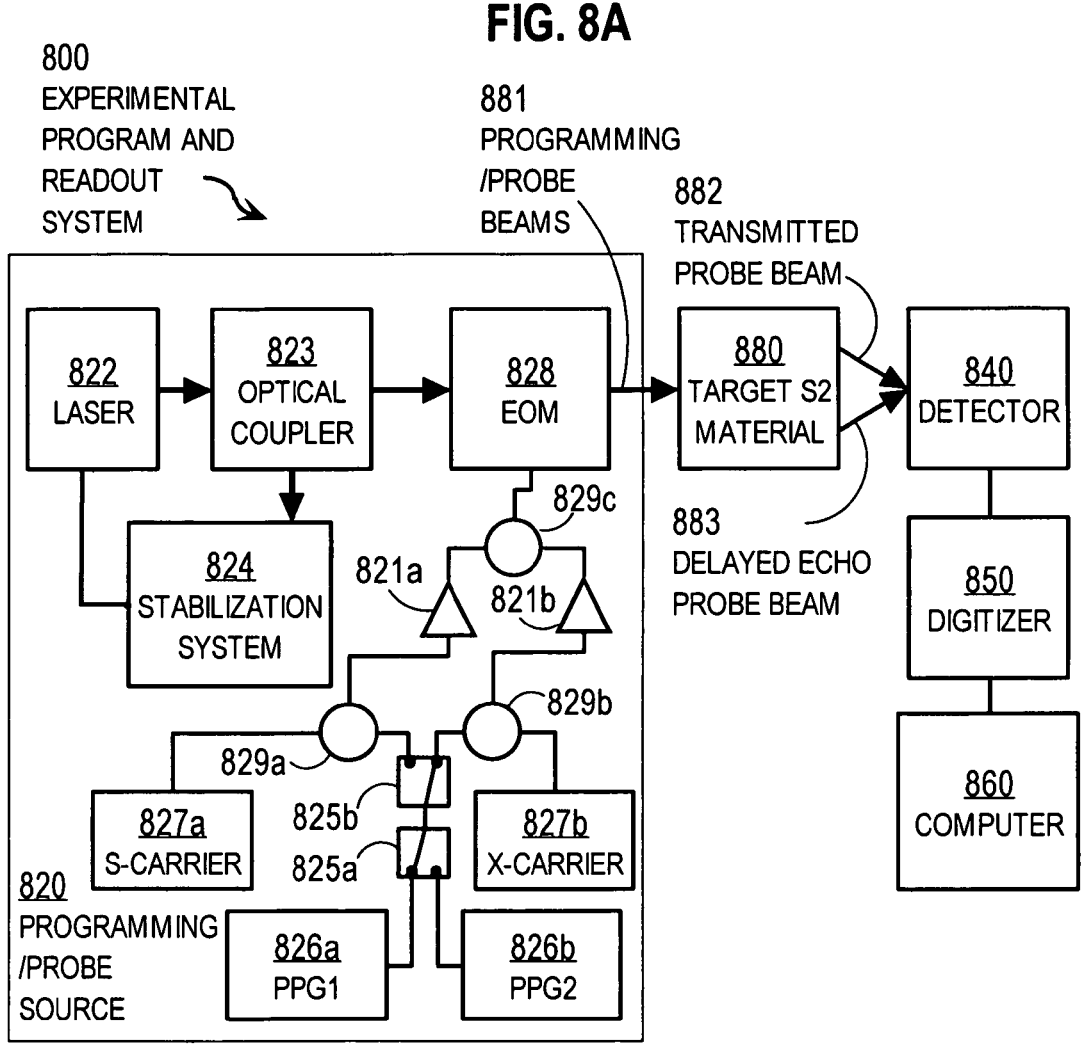
FIG. 8A is a block diagram that illustrates another experimental setup for recording and detecting delays in two radar bands, according to an embodiment.

FIG. 8A is a block diagram that illustrates an experimental setup 800 for recording and detecting delays in two radar bands, according to this embodiment. Setup 800 is an experimental programming and readout system that includes a programming/probe source 820, a target S2 material 880, a detector 840, a digitizer 850 and a computer 860, similar to those described above with reference to FIG. 1B and 6A. The source 820 includes a laser 822, optical coupler 823, and stabilization system 824 for producing a stabilized laser beam, as described above with respect to FIG. 6A. The source also includes EOM 828 for modulating the laser beam by RF chirps formed by pulse pattern generators 826a, 826b added to IF carriers produced by S-band carrier RF source 827a and X-band carrier RF source 827b. The source 820 also includes switches 825a, 825b, signal power combiners called "adders" 829a, 829b, 829c and amplifiers 821a, 821b.

Here, the two pulse pattern generators, PPG1 826a and PPG2 826b, are utilized, one to simulate the wideband transmit and receive radar waveforms for processing and one to create the readout chirps needed to probe the stored results, respectively. These waveforms are phase modulated onto an optical carrier using the electro-optic phase modulator 828 and processed in real time by the S2 material to produce an interaction spectrum as a spectral grating in the S2 material. The processed results are stored in the material as a modulated absorption spectra and last for the persistence time of the material, which is approximately 10 ms.

Figure 8B:
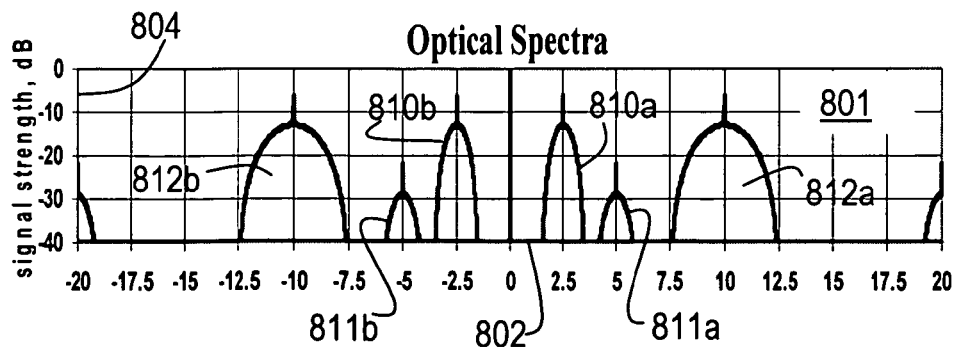
FIG. 8B is a graph that indicates the optical bands in which experimental signals are recorded using the experimental setup of FIG. 8A, according to an embodiment.

FIG. 8B is a graph 801 that indicates the optical bands in which experimental signals are recorded using the experimental setup of FIG. 8A, according to an embodiment. FIG. 8B shows the programming pulse from the simultaneous S- and X-Band experimental embodiment. FIG. 8B includes a horizontal frequency axis 802 indication deviations from the optical carrier in GHz. FIG. 8B includes a vertical signal strength axis 804 increasing upwards. The optical spectra plotted on graph 801 indicate the programming beam produced by source 820 and stored in S2 material as a result of the phase modulations produced in the EOM by the driving RF voltages from RF sources 826a, 826b, 827a, 827b, and other electronic components.

The transmit and receive waveforms were operated at 1 GBit/s and mimicked a 1 μs delay to the target. The first switch 825a after the PPGs 826a, 826b was used to control the feeding of the simulated radar transmit and return codes in one contact position or the probe chirp waveforms in the other contact position. The second switch 825b was used to control which radar band the switched signals were passed to. Each band was allowed 10 shots of a 512 bit agile code at the pulse repetition frequency (PRF) of 100 kiloHertz (kHz, 1 kHz=$10^3$ cycles per second) before the other band was switched in. This switching repeated itself for a total of 10 ms of integration time, with each band receiving half of the total integration time. Then the readout waveforms were switched in and, during the first 100 µs, an 800 MHz chirp was up-shifted to the X-band carrier and symmetrically excited a response out the spectral grating at X-band. Next, the band switch 825b contact position was changed to the S-band allowing a second 100 µs chirp with 600 MHz bandwidth to be mixed to the S-band symmetrically reading out the spectral grating at S-band.

Thus, PPG1 826a produces two simultaneous, frequency-offset digital RF chirps with bandwidths on the order of about one GHz, similar to SLCs 612a, 611a in FIG. 6B, to simulate a transmitted and received radar signal. These SLCs from PPG1 826a are modulated onto the X-band carrier frequency at about 10 GHz through the arrangement of contacts illustrated in FIG. 8A in switches 825a, 825b and adder 829b. The resulting signal is amplified in amplifier 821b to produce the spectral X-band 812a in FIG. 8B which is summed in adder 829c. The summed signal is used to modulate the laser pulse in EOM 828 which produces the symmetric X-band 812b.

Similarly, a different arrangement of switch 825b yields the symmetric S-bands 810a, 810b. Specifically, the SLCs from PPG1 826a are modulated onto the S-band carrier frequency at about 2.5 GHz by changing the contact illustrated for switch 825b and using adder 829a. The resulting signal is amplified in amplifier 821a to produce the spectral S-band 810a in FIG. 8B which is summed in adder 829c. The summed signal is used to modulate the laser pulse in EOM 828 which produces the symmetric S-band 810a, 810b. Also shown is the second order S-band sidebands 811a,811b.

The probe beam is formed by applying a wider band LSC from PPG2 826b using a different contact than illustrated in switch 825a and different contact than illustrated in switch 825b to add the probing chirp first in adder 829a to the RF signal from the S-band source 827a. This RF signal is amplified in amplifier 821a and used to modulate the laser pulse in EOM 828 for the duration of the pulse (e.g., for the first 100 µs). For a subsequent duration, the contacts in switch 825b are changed to use the probe LSC to modulate the RF signal from X-band source 827b in adder 829b. This RF signal is amplified in amplifier 821b and used to modulate the laser pulse in EOM 828 for the next duration of the pulse (e.g., for the next 100 µs).

FIG. 9A is a graph 900a that illustrates a response signal excited by a multiple sideband probe beam and detected using the experimental setup of FIGS. 8A and 8B, according to an embodiment. Graph 900a includes a horizontal time axis 902a, which can be converted to frequency deviations from an optical carrier for axis based on the chirp rate of the probe beam. Graph 902a includes a vertical detected signal strength axis 904a in volts with signal strength increasing upwards. Plotted on graph 900 is the heterodyne temporal readout signal 910 at detector 840 for the first 100 µs based on chirping over the X-band and the readout signal 920 for the second 100 µs based on chirping over the S-band. A periodic component in traces 910, 920 represents the delay between the MLSCs programmed into the S2 material.

Figure 9E:
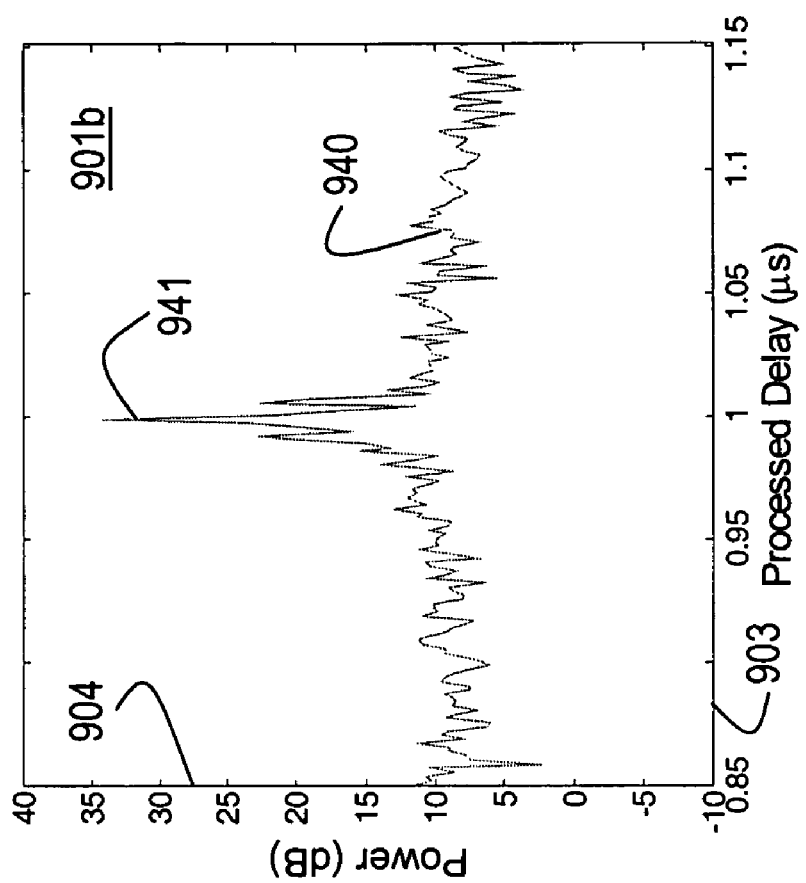

FIG. 9B, FIG. 9C, FIG. 9D, and FIG. 9E are graphs that illustrate results of processing the detected response signal of traces 910, 920 in FIG. 9A, according to an embodiment.

FIG. 9B is a graph 900b that illustrates a trace 912 that is an expanded view of a portion of trace 910. The horizontal axis 902b is a 10 µs range of the horizontal axis 902a, described above for FIG. 9A. The vertical axis 904b is detected signal strength in volts as in FIG. 9A but at a much finer scale. A strong periodic component is evident in trace 912 and is indicative of a primary delay to target. Similarly, FIG. 9C is a graph 900c that illustrates a trace 922 that is an expanded view of a portion of trace 920. The horizontal axis 902c is a 10 µs range of the horizontal axis 902a, described above for FIG. 9A. The vertical axis 904c is detected signal strength in volts as in FIG. 9A but at a finer scale. A strong periodic component is evident in trace 922 and is indicative of a primary delay to target.

Figure 9D:
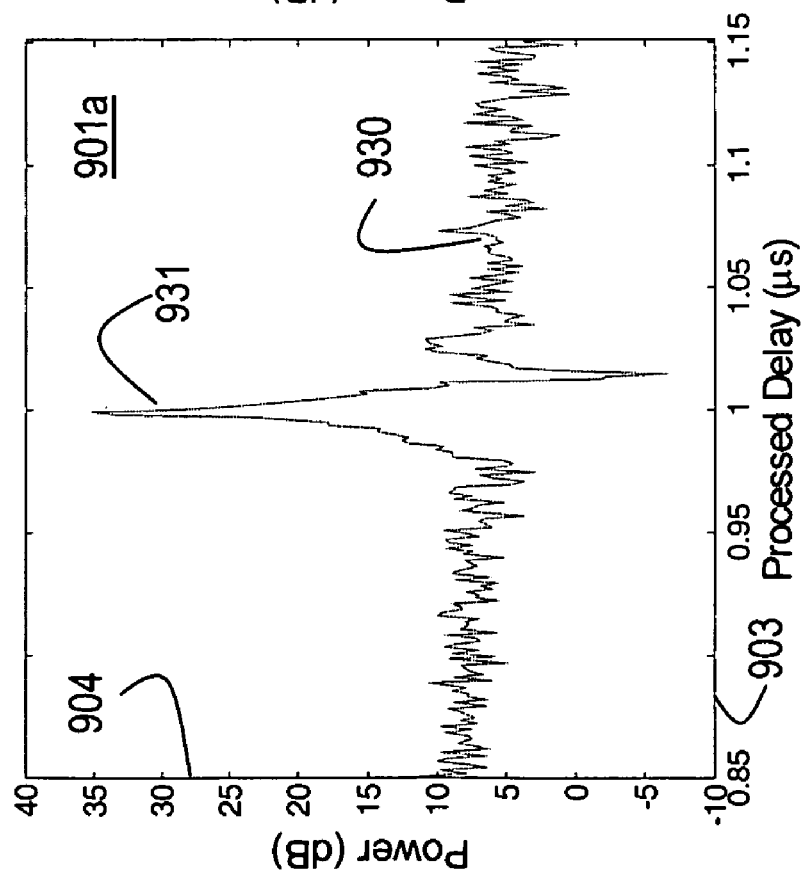

Once these readout signals of traces 910, 920 are post processed using a Fourier transform, the actual delay information is obtained showing the target information. FIG. 9D is a graph 901a that illustrates the Fourier transform of trace 910 as trace 930. Graph 901a includes a horizontal frequency axis 903 that indicates temporal delay extracted from the readout response signal in microseconds. Graph 901a includes a vertical power axis 904 in deciBels (dB) with power increasing upwards. Plotted on graph 901a is the Fourier transform trace 930 of the X-band trace 910 in FIG. 9A. As can be seen in FIG. 9D, there is a very strong peak 931 at an extracted delay of 1 µs with a dynamic range of about 25 dB.

FIG. 9E is a graph 901b that illustrates the Fourier transform of trace 920 as trace 940. Graph 901b includes a horizontal frequency axis 903 a vertical power axis 904 as described in FIG. 9D. Plotted on graph 901b is the Fourier transform trace 940 of the S-band trace 920 in FIG. 9A. As can be seen in FIG. 9D, there is a very strong peak 941 at an extracted delay of 1 µs with a dynamic range of about 25 dB.

Thus both the S-band and X-band processed delays are shown, each with better than 2 ns resolution and approximately 25 dB of SNR. It is important to note that signal to noise ratios of greater than 40 dB have been demonstrated in the laboratory at both S-band and X-band. This multi-band experiment successfully demonstrates commercially useful processing with MSLC probe beams.

4.8 Demonstration for Spectral Analysis

Another demonstrated embodiment is also an application of an S2CHIP device described as the S2 spectrum analyzer (S2SA). In this embodiment the S2SA utilizes DSR to properly discover spectral features. In this embodiment, unknown and potentially aperiodic and arbitrary spectral features are recorded in the S2 material. The size of the features recorded may span from the material's homogeneous linewidth to the inhomogeneous linewidth, and therefore application of DSR at a given sweep rate can discover these features as discussed above and in Chang II. In general, no restraint or limitations on the sweep rate is anticipated and note that under the proper situations given enough dynamic range, issues arising from extremely fast chirp rates may be de-convolved from the final readout spectra as described in Chang I.

In practice, DSR may be applied to a S2SA device in a plurality of resolution modes. For example, in some embodiments, initial discovery of spectral information over a large band can be achieved via a 'fast' chirp over the band of interest, representing a relatively low resolution mode. The DSR approach may then operate on a relatively high resolution mode to investigate a particular feature by slowly chirping over the feature, thereby more accurately resolving the spectral content of that feature. As is noted by Chang II, an arbitrary spectral feature may be decomposed into a series of amplitude and frequency weighted spectral gratings. Chirping over the arbitrary feature, regardless of the chirp rate, can be viewed as chirping over the series of gratings with the resultant transmission being a heterodyned superposition of echoes with the transmitted chirped pulse.

While the mathematical description of ChangII is valid, for purposes of illustration, the high resolution mode of the DSR is described through basic absorption spectroscopy.

In general, it is assumed that the spectral features to be discovered from the S2SA have a point of symmetry such as that of symmetry condition C1 described above. This is typically satisfied, because the readout and programming lasers are usually the same source, and the recorded signals are modulated onto the optical carrier by the same EOM that is used for the readout signals. Under this situation, and retaining only the first order sidebands, the DSR fields are given in Equation 9.

$$E_c(t) = A_c \cos(\omega_c t) \tag{9a}$$

$$E_U(t) = A_U \cos(\omega_c t + \omega_{Start} t + \pi \gamma t^2 + \phi_U) \tag{9b}$$

$$E_L(t) = A_L \cos(\omega_c t + \omega_{Start} t - \pi \gamma t^2 + \phi_L) \tag{9c}$$

The transmitted DSR fields, which experience time dependant absorption according to the frequency dependant S2 absorption spectrum, may be described according to Equation 10.

$$E_c(t) = A'_c \cos(\omega_c t) \tag{10a}$$

$$E_U(t) = A_U(t) \cos(\omega_c t + \omega_{Start} t + \pi \gamma t^2 + \phi_U) \tag{10b}$$

$$E_L(t) = A_L(t) \cos(\omega_c t + \omega_{Start} t - \pi \gamma t^2 + \phi_L) \tag{10c}$$

The time dependant amplitudes, resulting from sweeping over the arbitrary spectral absorption profile, may be written as Equation 11.

$$A'(t) = A_c \exp(-\alpha_c L/2) \tag{11a}$$

$$A_U(t) = A_U \exp(-\alpha_U(t) L/2) \tag{11b}$$

$$A_L(t) = A_L \exp(-\alpha(t) L/2) \tag{11c}$$

where the time dependant absorption coefficient $\alpha(t)$ is simply the typical frequency dependant absorption coefficient $\alpha(\omega)$ with the coordinate transformation $\omega \to t$ and the value transformation of $t_0 = \omega_0/(2\pi\gamma)$. The detected signal is then given by Equation 12.

$$I_{Det}(t) \sim \langle |E_{Trans}(t)|^2 \rangle_{\tau_{Det}} \tag{12a}$$

$$|E_{Trans}(t)|^2 = |E_c|^2 + |E_U|^2 + |E_L|^2 \tag{12b}$$

invoking the previously cited condition that $BW_{Det} < \omega_{start}$.

As an example, we consider an S2 material with two Lorentzian holes, burned at $+/-\omega_0$ from the laser line center. The absorption coefficient may be expressed as:

$$\alpha(\omega) = \alpha_U(\omega) + \alpha(\omega)_L \tag{13a}$$

$$= \left[1 - \frac{\Delta\omega_{Hole}^2}{(\omega - \omega_0)^2 + \Delta\omega_{Hole}^2}\right]\alpha_0(\omega) + \left[1 - \frac{\Delta\omega_{Hole}^2}{(\omega + \omega_0)^2 + \Delta\omega_{Hole}^2}\right]\alpha_0(\omega) \tag{13b}$$

where $\alpha_0(\omega)$ is the inhomogeneous absorption profile, $\Delta\omega_{Hole}$ is the hole half width and $\omega_0$ is the frequency location of the hole from the laser line center. The time dependant absorption coefficient, according to the above transformation, is:

$$\alpha(t) = \left[1 - \frac{\left(\frac{\Delta\omega_{Hole}}{\gamma_U}\right)^2}{\left(t - \frac{\omega_0}{\gamma_U}\right)^2 + \left(\frac{\Delta\omega_{Hole}}{\gamma_U}\right)^2}\right]\alpha_0(t) + \left[1 - \frac{\left(\frac{\Delta\omega_{Hole}}{\gamma_L}\right)^2}{\left(t + \frac{\omega_0}{\gamma_L}\right)^2 + \left(\frac{\Delta\omega_{Hole}}{\gamma_L}\right)^2}\right]\alpha_0(t) \tag{14a}$$

where the temporal hole width is now $$\Delta\tau_{Hole} = \frac{\Delta\omega_{Hole}}{\gamma} \tag{14b}$$

and the temporal hole location is now $$t_0 = \frac{\omega_0}{\gamma}. \tag{14c}$$

It is important to keep track of the upper and lower chirp rates $\gamma_u$ and $\gamma_l$ as $\gamma_u = \gamma$ and $\gamma_l = -\gamma$, giving:

$$\alpha(t) = 2\left[1 - \frac{\Delta\tau_{Hole}^2}{(t - t_0)^2 + \Delta\tau_{Hole}^2}\right]\alpha_0(t) \tag{14d}$$

This result shows how the time dependant absorption experienced by the two chirps is identical in time for this symmetric case. The detected signal is expressed as, $$I_{Det}(t) \sim \langle |E_{Trans}(t)|^2 \rangle_{\tau_{Det}} \tag{15a}$$

$$|E_{Trans}(t)|^2 = |E_c|^2 + |E_U|^2 + |E_L|^2 \tag{15b}$$

$$= |A_c|^2 \exp(-\alpha_c L) + 2|A|^2 \exp(-\alpha(t)L) \tag{15c}$$

Figure 10A:
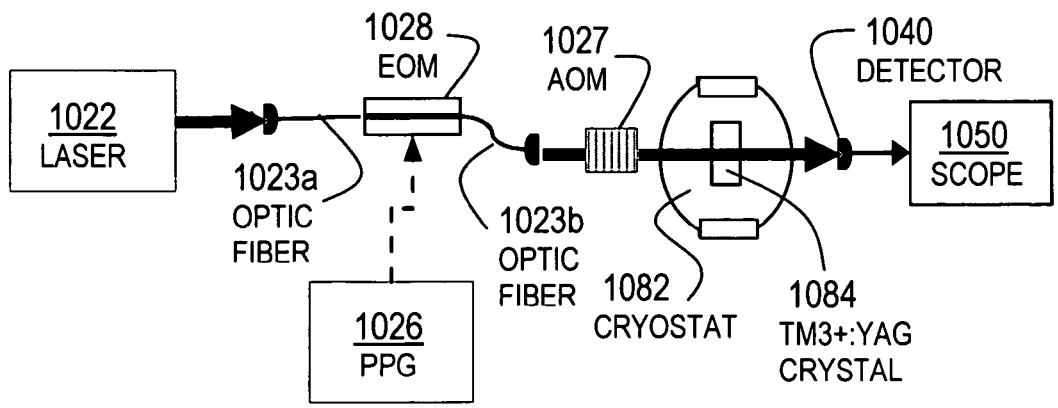
FIG. 10A is a block diagram that illustrates yet another experimental setup for spectral analysis, according to an embodiment.

FIG. 10A is a block diagram that illustrates yet another experimental setup for spectral analysis, according to an embodiment. Here a frequency stabilized laser source 1022 is electro-optically encoded via a phase modulator EOM 1028 driven by pulse pattern generator (PPG) 1026 and acousto-optically gated in AOM 1027. Optic fibers 1023a, 1023b are used as optical couplers to pass the laser beam from source 1022 into EOM 1028 and thence to AOM 1027. The resulting modulated beam passes through the cryogenically cooled sample 1084 of Tm:YAG in cryostat 1082 and onto a detector 1040 from which a signal is digitized in scope 1050. The PPG 1026 performs both encoding of the spectral structures stored in the crystal, as well as the encoding of the DSR readout waveform.

Figure 10B:
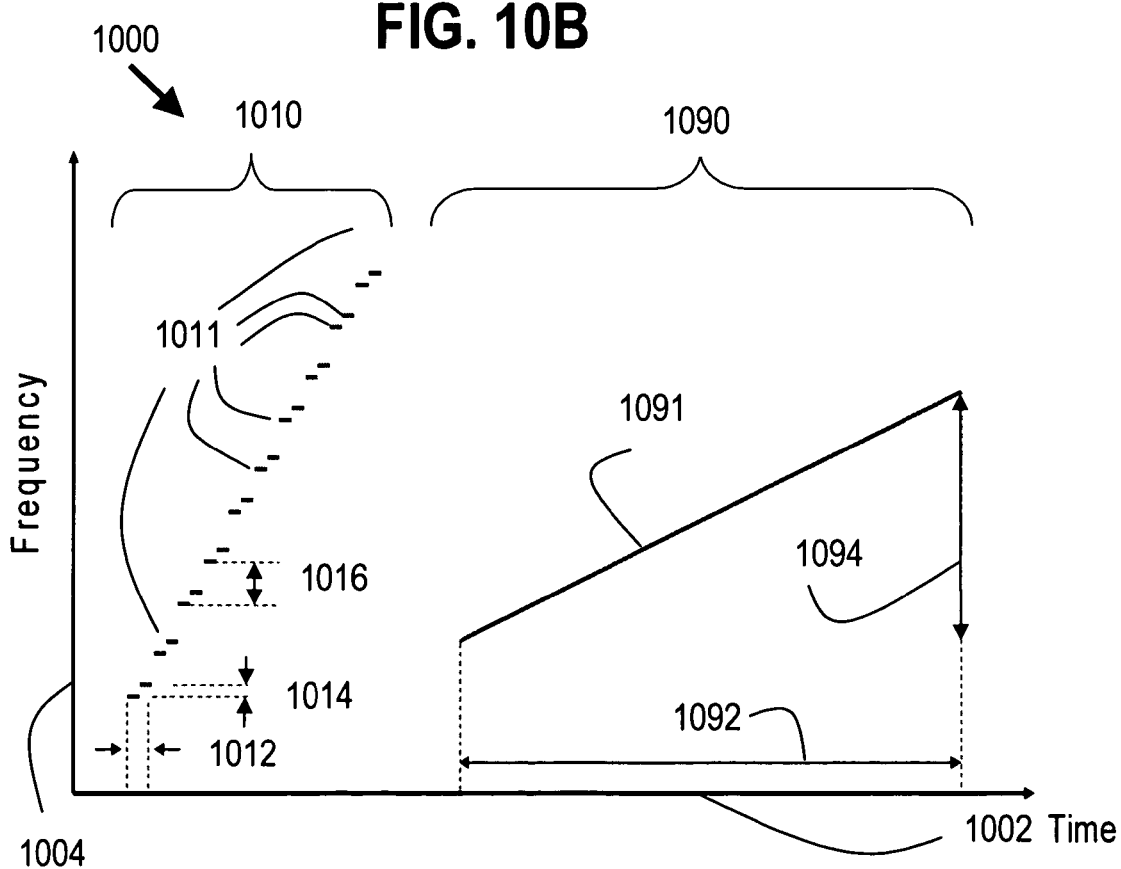
FIG. 10B is a graph that illustrates optical spectral holes recorded in a material and one of multiple sideband chirps in a probe beam for the experimental setup of FIG. 10A, according to an embodiment.

FIG. 10B is a graph 1000 that illustrates optical spectral holes recorded in a material and one of multiple sideband chirps in a probe beam for the experimental setup of FIG. 10A, according to an embodiment. FIG. 10B includes horizontal time axis 1002 and vertical frequency axis 1004. The RF spectrum out of the PPG 1026 is depicted in portion 1010 of the graph. Spectral holes 1011 are programmed. For purposes of illustration, ten pairs of a series of 20 spectral hole pairs are shown in graph 1000. There is a 1 MHz separation between the holes in each pair as indicated by frequency interval 1014. The separation between each pair is 50 MHz as indicated by frequency interval 1016 so that the twenty pair spans 1 GHz from 1.3-2.3 GHz. The duration of recording each spectral hole, indicated by the time interval 1012, was about 2 μs. Recording lasted 100 μs, after which a DSR readout sweep with duration 1092 of 500 μs was applied as indicated by the +1 sideband chirp 1091 plotted in the second portion 1090 of graph 1000. The bandwidth 1094 over which the DSR sweep was applied was 1.2 GHz for low resolution and 20 MHz for high resolution modes.

Figure 11A:
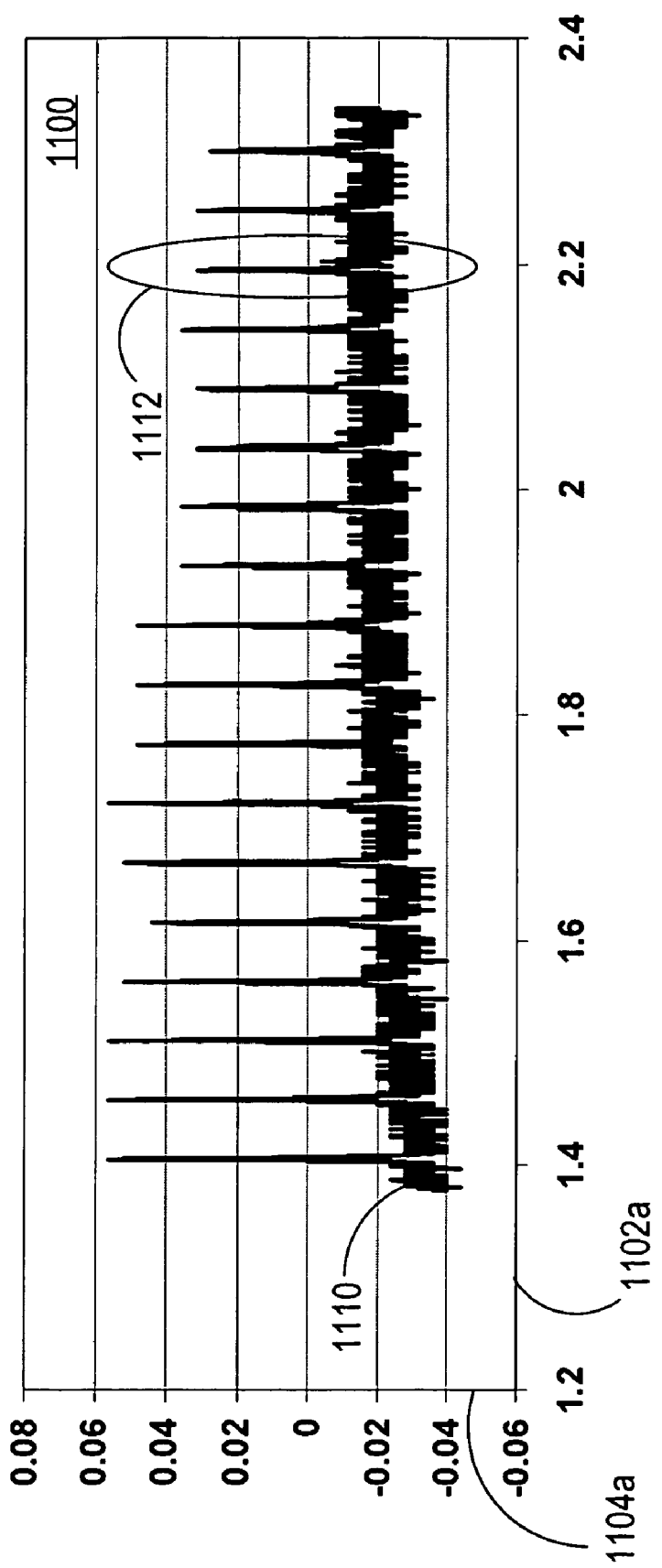
FIG. 11A is a graph that illustrates a response signal excited by a fast chirp multiple sideband probe beam and detected using the experimental setup of FIG. 10A and 10B, according to an embodiment.

FIG. 11A is a graph 1100 that illustrates a response signal trace 1110 excited by a fast chirp multiple sideband probe beam and detected using the experimental setup of FIG. 10A and 10B, according to an embodiment. Graph 1100 includes a horizontal frequency axis 1102a based on time in a temporal readout signal. Time at the readout signal is converted to frequency deviations from an optical carrier for axis 1102a based on the chirp rate of the probe beam. Graph 1100 includes a vertical signal strength axis 1104a, expressed in volts, increasing upwards. Plotted on graph 1100 is the heterodyne temporal readout signal 1110 at detector 1040 mapped to frequency deviations from an optical carrier in the target S2 material 1084. Graph 1100 shows the detected DSR signal for low resolution operation with a relatively fast chirp rate of about 1.2 GHz/500 μs. A spectral hole appears as a spike in trace 1110. All of 18 spikes that are anticipated are detected, however the fine structure of the features are not resolved. Because of the low resolution of trace 1110, each spectral hole pair appears as a single spike. For example, single spike 1112 occurs at the approximate readout time (frequency) of a pair of spectral holes burned at 2.300 and 2.301 GHz.

Figure 11B:
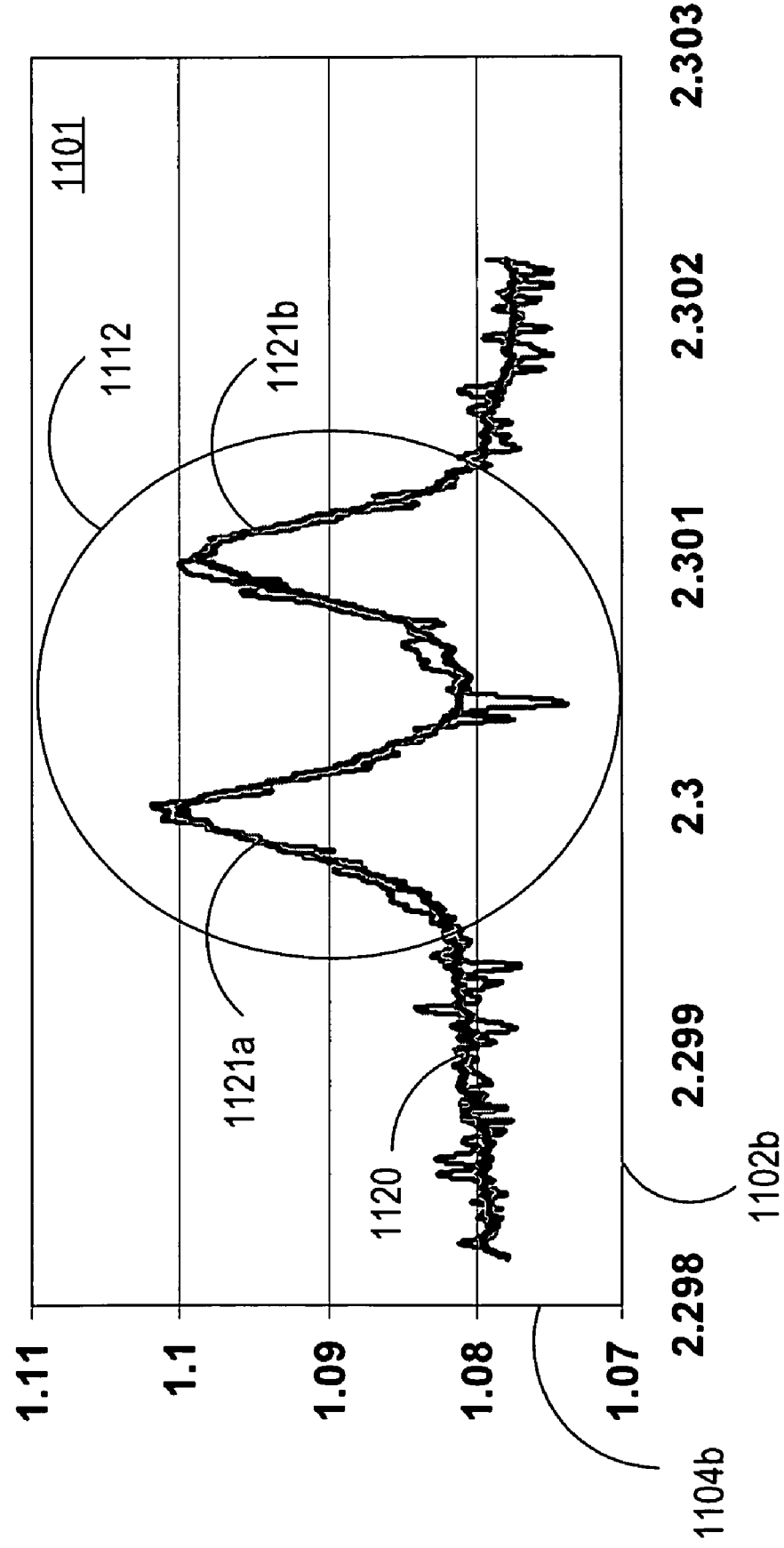
FIG. 11B is a graph that illustrates a response signal, excited by a slow chirp multiple sideband probe beam, and detected using the experimental setup of FIG. 10A and 10B, according to an embodiment.

FIG. 11B is a graph 1101 that illustrates a response signal trace 1120 excited by a slow chirp multiple sideband probe beam and detected using the experimental setup of FIG. 10A and 10B, according to an embodiment. Time at the readout signal is converted to frequency deviations from an optical carrier for axis 1102b based on the chirp rate of the probe beam. Graph 1101 includes a vertical signal strength axis 1104b, expressed in volts, increasing upwards. Plotted on graph 1101 is the heterodyne temporal readout signal 1120 at detector 1040 mapped to frequency deviations from an optical carrier in the target S2 material 1084. Graph 1101 shows the detected DSR signal for high resolution operation with a relatively slow chirp rate of about 20 MHz/500 μs. Trace 1120 resolves the dual tone fine structure as spikes 1121a and spike 1121b.

Graphs 1100 and 1101 conclusively show that the DSR technique can be successfully implemented in the S2SA architecture.

4.9 Demonstration for Fabry-Perot Cavity

Using the DSR technique, a readout signal can be extracted even when only a single sideband of the multiple LSC is spectrally overlapping with the spectral grating structure of interest, as depicted in FIG. 4B. In this case, the readout laser center frequency $\omega_0$, may be offset from the other spectral structures, which may have been created by another laser source with center frequency $\omega_L$. Under certain conditions, such as if a spectral grating is to be discovered, the detected signal can be represented using a simplification of equation (6c), taking the form, $$I_{Det}(t) \sim \frac{A^2}{2}\cos(\phi_{UGrating} - \theta_{Chirp} - 2\pi\gamma t\tau). \tag{16}$$

This essentially shows that the desired information contained in the spectral grating can be discovered via readout from a single sideband.

An experimental demonstration was performed to show readout of spectral features from a device instead of an absorptive material as well as to show single sideband readout. In this demonstration the spectral features from a Fabry-Perot cavity are used for readout. Such cavities, as is well known (see, for example, A. Siegman, "Lasers," University Science Books, 1986) have transmissive features that are repeated at an interval known as the free spectral range.

In the current demonstration embodiment, an external cavity diode laser (ECDL) was operated in a single mode and was coupled into a fiber where it passed through an EOM, similar to the left portion of FIG. 10A. This EOM was driven by a digital chirp that spanned frequencies from about 0.5 GHz to 1.5 GHz. This produced multiple order optical LSCs, with a first order bandwidth of 1.0 GHz, over a time of 500 μs. This chirp then passed to a scanning fiber coupled Fabry-Perot cavity that had a measured free spectral range of about 1.5 GHz. The transmission through the cavity was monitored with a low bandwidth, amplified photo-detector. Several experimental embodiments were examined.

Figure 12A:
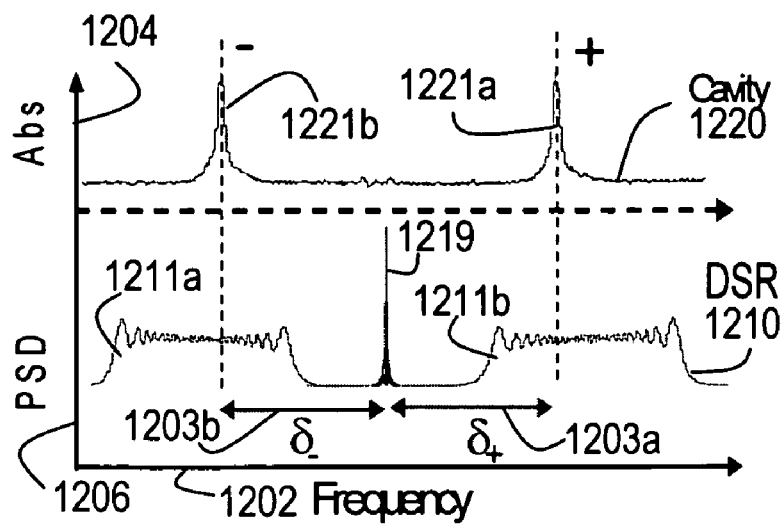
FIG. 12A, FIG. 12B and FIG. 12C are pairs of aligned graphs that illustrate the relationship between multiple sideband chirps and three targets that include cavities that resonate at different optical frequencies, according to several embodiments.
Figure 12B:
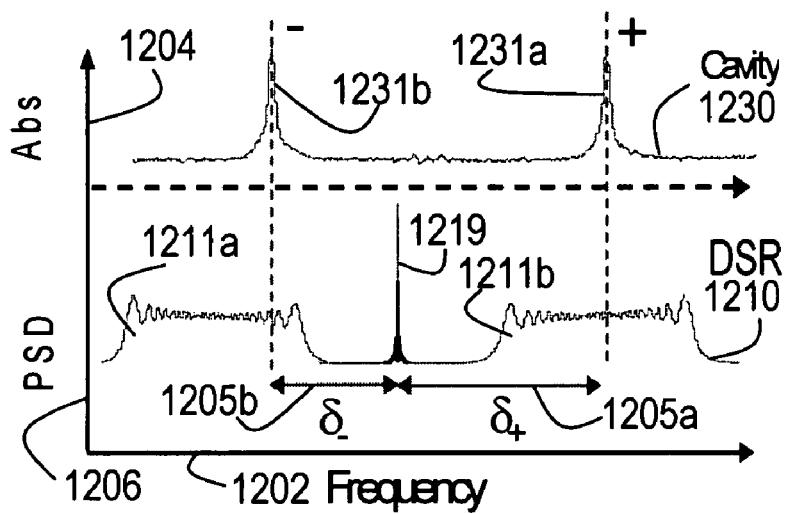
Figure 12C:
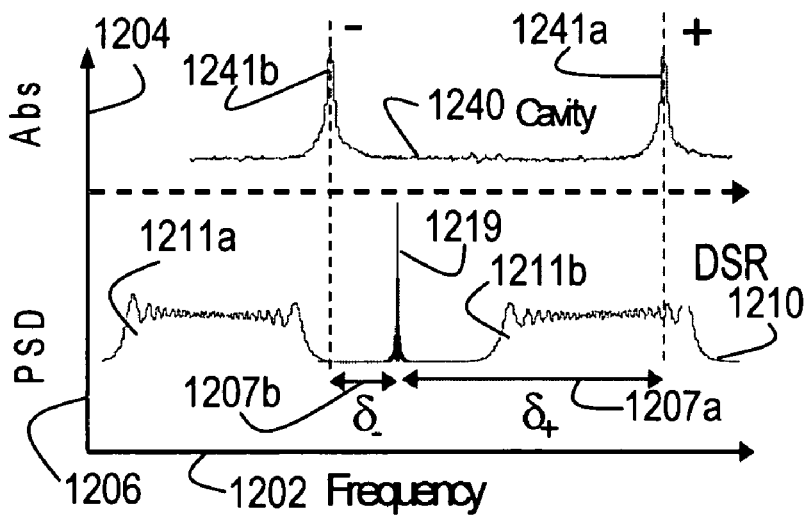

FIG. 12A, FIG. 12B and FIG. 12C are pairs of aligned graphs that illustrate the relationship between multiple sideband chirps and three targets that include Fabry-Perot cavities that resonate (e.g., are transmissive) at three different optical frequencies, respectively, according to three corresponding experimental embodiments.

FIG. 12A is a pair of aligned graphs that illustrate the relationship between symmetric first order sideband chirps and resonance in a first Fabry-Perot cavity according to a first experimental embodiment. The aligned graphs share a horizontal frequency axis 1202. The upper graph has a vertical absorption axis 1204 and the lower graph has a vertical power spectral density (PSD) axis 406. The upper graph shows an inverse absorption (e.g., a transmissive) spectrum 1220 for a Fabry-Perot cavity with two peaks 1221a, 1221b associated with transmissive features. The lower graph shows the frequency components of a dual sideband readout (DSR) waveform 1210 that is used as a probe beam to detect the transmissive spectra and that is similar to the DSR depicted in FIG. 4A and FIG. 4B. The optical carrier frequency is evident in the DSR 1210 as peak 1219. Also evident in the DSR are the +1 sideband 1211b and the −1 sideband 1211a. The frequency difference δ+ between the optical carrier frequency at peak 1219 and peak 1221a in the Fabry-Perot transmission 1220 is given by the frequency interval 1203a; the frequency difference δ− between the optical carrier frequency and peak 1221b is given by the frequency interval 1203b. The two peaks 1221a, 1221b of the first Fabry-Perot cavity are evenly distributed around the optical carrier frequency indicated by spike 1219; and therefore δ+=δ−.

Thus, in a first Fabry-Perot cavity embodiment, a point of spectral symmetry was found; e.g., the cavity transmission features are centered around the optical carrier frequency for the probe beam as shown in the 12A. Using the conversion to find when these features will be read out with respect to the start of the chirp, one simply divides the frequency offset by the chirp rate. In this case then, the spectral features both occur at the same time, a time designated $T_f$. A plot of the readout feature for the symmetric case is shown in FIG. 12D.

Figure 12D:
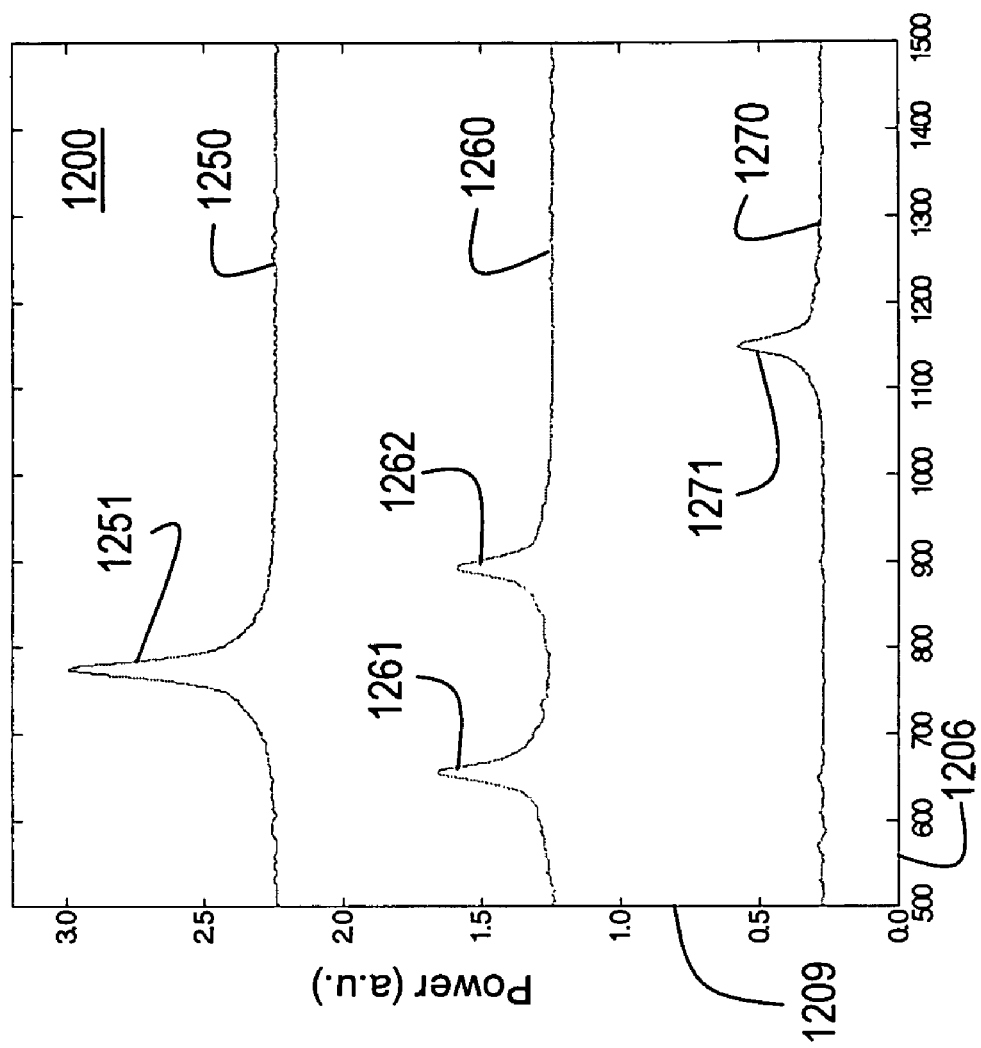
FIG. 12D is a graph that illustrates three response signals excited by the multiple sideband chirps, according to corresponding embodiments.

FIG. 12D is a graph 1200 that illustrates three response signals excited in different Fabry-Perot cavities by the multiple sideband chirps, according to corresponding experimental embodiments. Graph 1200 includes a horizontal frequency axis 1208 based on time in a temporal readout signal. Time at the readout signal is converted to frequency deviations from an optical carrier for axis 1208 based on the chirp rate of the probe beam. Graph 1200 includes a vertical power axis 1209 with power increasing upwards in arbitrary units (a.u.). Plotted on graph 1200 is the heterodyne temporal readout signal trace 1250 at a detector from the first Fabry-Perot cavity, mapped to frequency deviations from an optical carrier. An transmissive peak for the cavity appears as a peak on trace 1250. Also plotted on graph 1200, offset vertically to avoid obscuring each other, are readout signal traces 1260, 1270 detected from the second and third Fabry-Perot cavities, respectively, described in more detail below.

As is evident in trace 1250, there is only one spectral feature, which corresponds to both symmetric features read out simultaneously. This gives the familiar double signal two for one readout as described above. However, in this embodiment, the target is a cavity instead of an S2 material. In the first Fabry-Perot cavity experimental embodiment, the symmetric features are ~770 MHz from the carrier, as indicated by peak 1251.

In the second Fabry-Perot cavity experimental embodiment, the transmissive features are made to be non-symmetric around the readout carrier as shown in FIG. 12B. FIG. 12B is a pair of aligned graphs that illustrate the relationship between symmetric first order sideband chirps and resonance in the second Fabry-Perot cavity according to a second experimental embodiment. The axes 1202, 1204, 1206, DSR 1210, sidebands 1211a, 1211b, and optical carrier peak 1219 are as described above for FIG. 12A. The upper graph shows an absorption spectrum 1230 for the second Fabry-Perot cavity with two peaks 1231a, 1231b. The frequency difference δ+ between the optical carrier frequency at peak 1219 and peak 1231a in the Fabry-Perot trace 1220 is given by the frequency interval 1205a; the frequency difference δ− between the optical carrier frequency and peak 1231b is given by the frequency interval 1205b.

In FIG. 12B, δ+ is greater than δ−. Therefore it is expected that peak 1231b will be detected separately from and earlier than peak 1231a. That is, the lower frequency chirp 1211a interacts with transmissive feature 1231b at a time, T., which is less than the point of symmetry time $T_f$. Whereas the higher frequency chirp 1211b interacts with a transmissive feature 1231a at a time, $T_+$, which is greater than the point of symmetry time, $T_f$. Thus each feature is read out independently by different sidebands, resulting in what is termed single sideband readout.

The readout from the second Fabry-Perot cavity is trace 1260 on graph 1200 in FIG. 12D. Note that both features 1231b, 1231a are evident as peaks 1261, 1262, respectively, in trace 1260. The feature at ~650 MHz is the interaction of the lower frequency first order LSC 1211a with a transmissive feature 1231b and the feature at ~900 MHz is the interaction of the higher frequency first order LSC 1211b with transmissive feature 1231a. Also note that the signal strength of each peak 1261, 1262 is about half the signal strength of peak 1251.

In the third Fabry-Perot cavity experimental embodiment, the transmissive features are made to be substantially non-symmetric around the readout carrier as shown in FIG. 12C.

FIG. 12C is a pair of aligned graphs that illustrate the relationship between symmetric first order sideband chirps and resonance in the third Fabry-Perot cavity according to a third experimental embodiment. The axes 1202, 1204, 1206, DSR 1210, sidebands 1211a, 1211b, and optical carrier peak 1219 are as described above for FIG. 12A. The upper graph shows an inverse absorption spectrum 1240 for the third Fabry-Perot cavity with two peaks 1241a, 1241b. The frequency difference δ+ between the optical carrier frequency at peak 1219 and peak 1241a in the Fabry-Perot trace 1240 is given by the frequency interval 1207a; the frequency difference δ− between the optical carrier frequency and peak 1241b is given by the frequency interval 1207b.

In FIG. 12C, δ+ is greater than δ−, but the transmissive feature 1241b does not fall within the chirp 1211a and therefore does not interact with that chirp. Therefore it is expected that peak 1241b will not be detected and that peak 1241a will be detected late in the chirp. That is, the spectral resonance of the cavity overlaps with only one side of the DSR.

The readout from the third Fabry-Perot cavity is trace 1270 on graph 1200 in FIG. 12D. Note that only feature 1241a is evident as peak 1271 in trace 1270. The feature at ~1150 MHz is the interaction of the upper frequency first order LSC 1211b with transmissive feature 1241a.

5. Processor Hardware Overview

FIG. 13 is a block diagram that illustrates a computer system 1300 upon which an embodiment of the electronic control and post-processing steps of the invention may be implemented. Computer system 1300 includes a communication mechanism such as a bus 1310 for passing information between other internal and external components of the computer system 1300. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 1310 includes many parallel conductors of information so that information is transferred quickly among devices coupled to the bus 1310. One or more processors 1302 for processing information are coupled with the bus 1310. A processor 1302 performs a set of operations on information. The set of operations include bringing information in from the bus 1310 and placing information on the bus 1310. The set of operations also typically include comparing two or more units of information, shifting positions of units of information, and combining two or more units of information, such as by addition or multiplication. A sequence of operations to be executed by the processor 1302 constitute computer instructions.

Computer system 1300 also includes a memory 1304 coupled to bus 1310. The memory 1304, such as a random access memory (RAM) or other dynamic storage device, stores information including computer instructions. Dynamic memory allows information stored therein to be changed by the computer system 1300. RAM allows a unit of information stored at a location called a memory address to be stored and retrieved independently of information at neighboring addresses. The memory 1304 is also used by the processor 1302 to store temporary values during execution of computer instructions. The computer system 1300 also includes a read only memory (ROM) 1306 or other static storage device coupled to the bus 1310 for storing static information, including instructions, that is not changed by the computer system 1300. Also coupled to bus 1310 is a non-volatile (persistent) storage device 1308, such as a magnetic disk or optical disk, for storing information, including instructions, that persists even when the computer system 1300 is turned off or otherwise loses power.

Information, including instructions, is provided to the bus 1310 for use by the processor from an external input device 1312, such as a keyboard containing alphanumeric keys operated by a human user, or a sensor. A sensor detects conditions in its vicinity and transforms those detections into signals compatible with the signals used to represent information in computer system 1300. Other external devices coupled to bus 1310, used primarily for interacting with humans, include a display device 1314, such as a cathode ray tube (CRT) or a liquid crystal display (LCD), for presenting images, and a pointing device 1316, such as a mouse or a trackball or cursor direction keys, for controlling a position of a small cursor image presented on the display 1314 and issuing commands associated with graphical elements presented on the display 1314.

In the illustrated embodiment, special purpose hardware, such as an application specific integrated circuit (IC) 1320, is coupled to bus 1310. The special purpose hardware is configured to perform operations not performed by processor 1302 quickly enough for special purposes. Examples of application specific ICs include graphics accelerator cards for generating images for display 1314, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1300 also includes one or more instances of a communications interface 1370 coupled to bus 1310. Communication interface 1370 provides a two-way communication coupling to a variety of external devices that operate with their own processors, such as printers, scanners and external disks. In general the coupling is with a network link 1378 that is connected to a local network 1380 to which a variety of external devices with their own processors are connected. For example, communication interface 1370 may be a parallel port or a serial port or a universal serial bus (USB) port on a personal computer. In some embodiments, communications interface 1370 is an integrated services digital network (ISDN) card or a digital subscriber line (DSL) card or a telephone modem that provides an information communication connection to a corresponding type of telephone line. In some embodiments, a communication interface 1370 is a cable modem that converts signals on bus 1310 into signals for a communication connection over a coaxial cable or into optical signals for a communication connection over a fiber optic cable. As another example, communications interface 1370 may be a local area network (LAN) card to provide a data communication connection to a compatible LAN, such as Ethernet. Wireless links may also be implemented. For wireless links, the communications interface 1370 sends and receives electrical, acoustic or electromagnetic signals, including infrared and optical signals, that carry information streams, such as digital data. Such signals are examples of carrier waves.

The term computer-readable medium is used herein to refer to any medium that participates in providing information to processor 1302, including instructions for execution. Such a medium may take many forms, including, but not limited to, non-volatile media, volatile media and transmission media. Non-volatile media include, for example, optical or magnetic disks, such as storage device 1308. Volatile media include, for example, dynamic memory 1304. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Network link 1378 typically provides information communication through one or more networks to other devices that use or process the information. For example, network link 1378 may provide a connection through local network 1380 to a host computer 1382 or to equipment 1384 operated by an Internet Service Provider (ISP). ISP equipment 1384 in turn provides data communication services through the public, world-wide packet-switching communication network of networks now commonly referred to as the Internet 1390. A computer called a server 1392 connected to the Internet provides a service in response to information received over the Internet. For example, server 1392 provides information representing video data for presentation at display 1314.

The invention is related to the use of computer system 1300 for implementing the techniques described herein. According to one embodiment of the invention, those techniques are performed by computer system 1300 in response to processor 1302 executing one or more sequences of one or more instructions contained in memory 1304. Such instructions, also called software and program code, may be read into memory 1304 from another computer-readable medium such as storage device 1308. Execution of the sequences of instructions contained in memory 1304 causes processor 1302 to perform the method steps described herein. In alternative embodiments, hardware, such as application specific integrated circuit 1320, may be used in place of or in combination with software to implement the invention. Thus, embodiments of the invention are not limited to any specific combination of hardware and software.

The signals transmitted over network link 1378 and other networks through communications interface 1370, which carry information to and from computer system 1300, are exemplary forms of carrier waves. Computer system 1300 can send and receive information, including program code, through the networks 1380, 1390 among others, through network link 1378 and communications interface 1370. In an example using the Internet 1390, a server 1392 transmits program code for a particular application, requested by a message sent from computer 1300, through Internet 1390, ISP equipment 1384, local network 1380 and communications interface 1370. The received code may be executed by processor 1302 as it is received, or may be stored in storage device 1308 or other non-volatile storage for later execution, or both. In this manner, computer system 1300 may obtain application program code in the form of a carrier wave.

Various forms of computer readable media may be involved in carrying one or more sequence of instructions or data or both to processor 1302 for execution. For example, instructions and data may initially be carried on a magnetic disk of a remote computer such as host 1382. The remote computer loads the instructions and data into its dynamic memory and sends the instructions and data over a telephone line using a modem. A modem local to the computer system 1300 receives the instructions and data on a telephone line and uses an infra-red transmitter to convert the instructions and data to an infra-red signal, a carrier wave serving as the network link 1378. An infrared detector serving as communications interface 1370 receives the instructions and data carried in the infrared signal and places information representing the instructions and data onto bus 1310. Bus 1310 carries the information to memory 1304 from which processor 1302 retrieves and executes the instructions using some of the data sent with the instructions. The instructions and data received in memory 1304 may optionally be stored on storage device 1308, either before or after execution by the processor 1302.

6. Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for detecting optical spectral properties of a target, comprising the steps of:
   determining, for an optical chirp probe beam, attributes of each of a plurality of
      sidebands that have amplitudes sufficient to be detected at a detector, wherein
      the plurality of sidebands are frequency bands arranged symmetrically around an optical carrier frequency, and
      the attributes of a sideband include a start frequency, bandwidth and chirp rate;
   generating the probe beam with the plurality of sidebands;
   directing the probe optical beam onto a target having a physical property with an optical frequency dependence;
   detecting at the detector an optical response signal resulting from an interaction between the probe beam and the target; and
   determining the optical frequency dependence of the physical property of the target based on the optical response signal and the attributes of the plurality of sidebands.

2. A method as recited in claim 1, wherein:
   the method further comprises determining whether conditions are satisfied for unambiguous effects of the plurality of sidebands on the optical response signal; and
   said step of determining the optical frequency dependence is performed only if it is determined that conditions are satisfied for unambiguous effects of the plurality of sidebands.

3. A method as recited in claim 2, said step of directing the probe optical beam onto a target is performed only if it is determined that conditions are satisfied for unambiguous effects of the plurality of sidebands.

4. A method as recited in claim 2, said step of detecting the optical response signal is performed only if it is determined that conditions are satisfied for unambiguous effects of the plurality of sidebands.

5. A method as recited in claim 2, wherein the conditions are satisfied for unambiguous effects of the plurality of sidebands when the optical frequency dependence of the target is symmetric about the optical carrier frequency and intersects only one pair of symmetric sidebands that are detected simultaneously at the detector.

6. A method as recited in claim 2, wherein the conditions are satisfied for unambiguous effects of the plurality of sidebands when the optical frequency dependence of the target is symmetric about the optical carrier frequency and at least a subset of the frequency components of the optical frequency dependence of the target that is detected simultaneously at the detector produces a similar detector response.

7. A method as recited in claim 2, wherein the conditions are satisfied for unambiguous effects of the plurality of sidebands when the optical frequency dependence of each transmitted sideband chirp is spaced in frequency such that each transmitted sideband chirp can be segregated using frequency-dependent spatial-diffraction.

8. A method as recited in claim 2, wherein the conditions are satisfied for unambiguous effects of the plurality of sidebands when the optical frequency dependence of the target is spaced in frequency and stored using spatially distinct beams for each symmetric pair of frequency bands such that each transmitted sideband chirp can be segregated using spatially distinct detectors.

9. A method as recited in claim 2, wherein the conditions are satisfied for unambiguous effects of the plurality of sidebands when the optical frequency dependence of the target is on one side of the optical carrier frequency and only a subset of the sidebands detected simultaneously at the detector produce a similar response at the detector.

10. A method as recited in claim 2, wherein the conditions are satisfied for unambiguous effects of the plurality of sidebands when the optical frequency dependence of the target is on one side of the optical carrier frequency and is limited in spectral extent such that only a single sideband chirp produces a response at the detector.

11. A method as recited in claim 1, wherein:
   the method further comprises recording separately a portion of the optical frequency dependence of the target that leads to ambiguous effects at the detector; and
   said step of determining the optical frequency dependence further comprises removing the ambiguous effects based on the separate recording.

12. A method as recited in claim 1, further comprising programming the target with one or more programming optical beams modulated onto an optical beam having the optical carrier frequency.

13. An apparatus for detecting optical spectral properties of a target, comprising:
   a probe beam source for generating an optical chirp probe beam with a plurality of sidebands, wherein
      the plurality of sidebands are frequency bands arranged symmetrically around an optical carrier frequency,
      the attributes of a sideband include a start frequency, bandwidth and chirp rate, and
      the probe optical beam is directed onto a target having a physical property with an optical frequency dependence;

a detector for detecting an optical response signal resulting from an interaction between the probe beam and the target; and a processor configured for determining the optical frequency dependence of the physical property of the target based on the optical response signal and the attributes of the plurality of sidebands.

14. An apparatus for detecting optical spectral properties of a target, comprising:

means for determining, for an optical chirp probe beam, attributes of each of a plurality of sidebands that have amplitudes sufficient to be detected at a detector, wherein the plurality of sidebands are frequency bands arranged symmetrically around a optical carrier frequency, and the attributes of a sideband include a start frequency, bandwidth and chirp rate;

means for generating the probe beam with the plurality of sidebands;

means for directing the probe optical beam onto a target having a physical property with an optical frequency dependence;

means for detecting at the detector an optical response signal resulting from an interaction between the probe beam and the target; and means for determining the optical frequency dependence of the physical property of the target based on optical response signal and the attributes of the plurality of sidebands.

* * * * *